(12) United States Patent
Kersey

(10) Patent No.: US 7,245,385 B2
(45) Date of Patent: Jul. 17, 2007

(54) CHARACTERIZING UNSTEADY PRESSURES IN PIPES USING OPTICAL MEASUREMENT DEVICES

(75) Inventor: Alan D. Kersey, South Glastonbury, CT (US)

(73) Assignee: CiDRA Corporation, Wallingford, CT (US)

( * ) Notice: Subject to any disclaimer, the term of this patent is extended or adjusted under 35 U.S.C. 154(b) by 232 days.

(21) Appl. No.: 10/875,860

(22) Filed: Jun. 24, 2004

(65) Prior Publication Data

US 2005/0012935 A1 Jan. 20, 2005

Related U.S. Application Data

(60) Provisional application No. 60/482,432, filed on Jun. 24, 2003.

(51) Int. Cl.
*G01B 9/02* (2006.01)
*G01B 11/02* (2006.01)
*G01P 3/36* (2006.01)
*G01L 1/24* (2006.01)

(52) U.S. Cl. .................. 356/519; 356/28.5; 356/35.5; 356/498

(58) Field of Classification Search .............. 356/28.5, 356/35.5, 454, 496, 498, 519; 73/800
See application file for complete search history.

(56) References Cited

U.S. PATENT DOCUMENTS 2,874,568 A 2/1959 Petermann ............ 73/861.02
4,048,853 A 9/1977 Smith et al. ........... 73/861.25
4,080,837 A 3/1978 Alexander et al. ....... 73/61.45
4,195,517 A 4/1980 Kalinoski et al. ....... 73/461.27

(Continued)

FOREIGN PATENT DOCUMENTS

WO    WO 93/14382    7/1993

(Continued)

OTHER PUBLICATIONS

"Two Decades of Array Signal Processing Research", The Parametric Approach, H. Krim and M. Viberg, IEEE Signal Processing Magazine, Jul. 1996, pp. 67-94.

(Continued)

*Primary Examiner*—Hwa (Andrew) Lee
*Assistant Examiner*—Michael A. Lyons
(74) *Attorney, Agent, or Firm*—Robert D. Crawford

(57) ABSTRACT

An apparatus for measuring at least one parameter associated with a fluid flowing within a pipe comprises an optical measurement device and a signal processor. The optical measurement device provides output signals indicative of unsteady pressures within the fluid at two or more axial locations along the pipe in response to light reflected from an outer surface of the pipe. The signal processor provides an output signal indicative of at least one parameter associated with the fluid in response to the output signals. The optical measurement device may include, for example, an electronic speckle pattern interferometer, a Fabry-Perot device, and/or a laser vibrometer. The at least one parameter may include at least one of: density of the fluid, volumetric flow rate of the fluid, mass flow rate of the fluid, composition of the fluid, entrained air in the fluid, consistency of the fluid, size of particles in the fluid, and health of a device causing the unsteady pressures to be generated in the pipe.

48 Claims, 14 Drawing Sheets

U.S. PATENT DOCUMENTS

| | | | | |
|---|---|---|---|---|
| 4,445,389 | A | 5/1984 | Potzick et al. | 73/861.27 |
| 4,591,996 | A | 5/1986 | Vachon | |
| 4,896,540 | A | 1/1990 | Shakkottai et al. | 73/861.02 |
| 5,285,675 | A | 2/1994 | Colgate et al. | 73/23.2 |
| 5,414,509 | A * | 5/1995 | Veligdan | 356/484 |
| 5,770,806 | A | 6/1998 | Hiismaki | 73/861.29 |
| 5,835,884 | A | 11/1998 | Brown | 73/861.04 |
| 5,856,622 | A | 1/1999 | Yamamoto et al. | 73/861.28 |
| 5,948,959 | A | 9/1999 | Peloquin | 73/1.83 |
| 6,354,147 | B1 | 3/2002 | Gysling et al. | |
| 6,435,030 | B1 | 8/2002 | Gysling et al. | |
| 6,450,037 | B1 | 9/2002 | Davis et al. | |
| 6,463,813 | B1 | 10/2002 | Gysling et al. | |
| 6,536,291 | B1 | 3/2003 | Gysling et al. | |
| 6,587,798 | B2 | 7/2003 | Gysling et al. | |
| 6,609,069 | B2 | 8/2003 | Gysling | |
| 6,691,584 | B2 | 2/2004 | Gysling et al. | |
| 6,732,575 | B2 | 5/2004 | Gysling et al. | |
| 6,782,150 | B2 | 8/2004 | Davis et al. | |
| 6,837,098 | B2 | 1/2005 | Gysling et al. | |
| 6,889,562 | B2 | 5/2005 | Gysling et al. | |
| 6,898,541 | B2 | 5/2005 | Gysling et al. | |
| 6,945,095 | B2 | 9/2005 | Johansen | 73/861.18 |
| 6,945,291 | B2 | 9/2005 | Chuang | 144/117.1 |
| 6,950,760 | B2 | 9/2005 | Henry et al. | 702/45 |
| 6,959,604 | B2 | 11/2005 | Davis et al. | |
| 6,971,259 | B2 | 12/2005 | Gysling | |
| 6,988,411 | B2 | 1/2006 | Gysling et al. | |
| 7,032,432 | B2 | 4/2006 | Gysling et al. | |
| 2002/0194932 | A1 | 12/2002 | Winston | |
| 2003/0038231 | A1 | 2/2003 | Winston | |
| 2003/0089161 | A1 | 5/2003 | Gysling | |
| 2003/0136186 | A1 | 7/2003 | Gysling | |
| 2003/0154036 | A1 | 8/2003 | Gysling et al. | |
| 2004/0069069 | A1 | 4/2004 | Gysling | |
| 2004/0074312 | A1 | 4/2004 | Kersey | |
| 2004/0168523 | A1 | 9/2004 | Fernald et al. | |
| 2004/0199340 | A1 | 10/2004 | Kersey et al. | |
| 2004/0199341 | A1 | 10/2004 | Gysling et al. | |
| 2004/0210404 | A1 | 10/2004 | Gysling et al. | |
| 2004/0226386 | A1 | 11/2004 | Gysling et al. | |
| 2004/0255695 | A1 | 12/2004 | Gysling et al. | |
| 2005/0005912 | A1 | 1/2005 | Joos et al. | |
| 2005/0011258 | A1 | 1/2005 | Gysling et al. | |
| 2005/0011283 | A1 | 1/2005 | Gysling et al. | |
| 2005/0011284 | A1 | 1/2005 | Gysling et al. | |
| 2005/0050956 | A1 | 3/2005 | Gysling et al. | |
| 2005/0120799 | A1 | 6/2005 | Gysling et al. | |
| 2005/0171710 | A1 | 8/2005 | Gysling et al. | |

FOREIGN PATENT DOCUMENTS

| | | |
|---|---|---|
| WO | WO 99/067629 | 12/1999 |

OTHER PUBLICATIONS

"Development of an array of pressure sensors with PVDF film, Experiments in Fluids 26", Jan. 8, 1999, Springer-Verlag.

"New Flowmeter Principle"—By: Walt Boyes—Published in Flow Control Magazine—Oct. 2003 Issue.

Sonar-Based Volumetric Flow Meter for Pulp and Paper Applications—By: Daniel L. Gysling & Douglas H. Loose—Dec. 3, 2002.

Sonar Based Volumetric Flow Meter for Chemical and Petrochemical Applications—By: Daniel L. Gysling & Douglas H. Loose—Feb. 14, 2003.

Sonar Based Volumetric Flow and Entrained Air Measurement for Pulp and Paper Applications—By: Daniel L. Gysling & Douglas H. Loose—Jan. 24, 2003.

"Mass Fraction Measurements in Multiphase Flows using a Clamp-on PVDF Array"- Johan Carlson, IEEE Ultrasonics Symposium Proceedings, vol. 1 Apr. 18, 2001, pp. 471-474.

"Viscous Attenuation of Acoustic Waves in Suspensions" by R.L. Gibson, Jr. and M.N. Toksoz, 1989 Acoustical Society of America, May 1989, pp. 1925-1934.

* cited by examiner

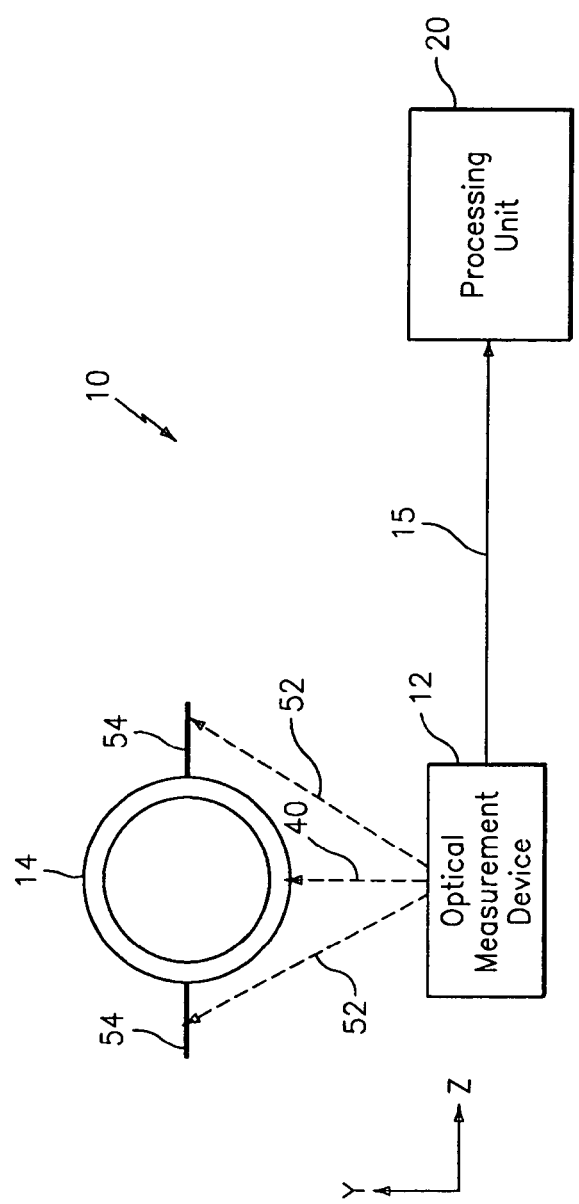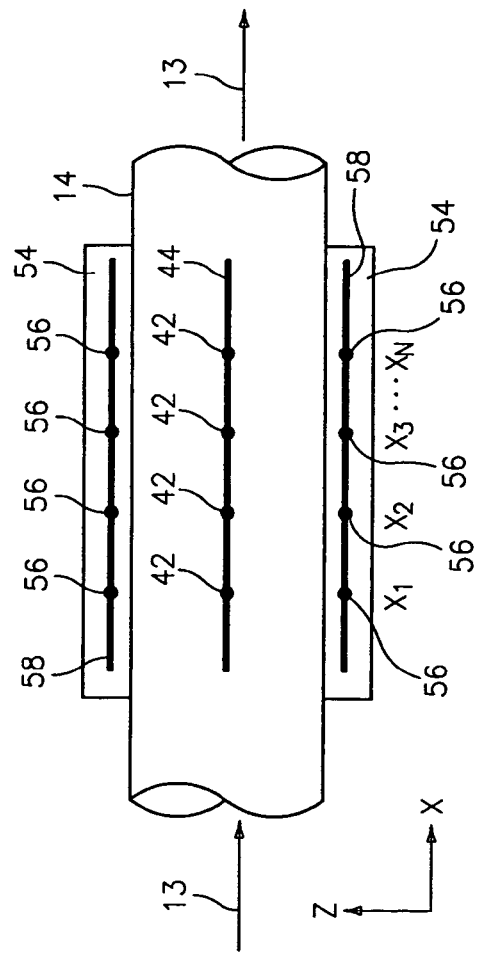
FIG. 3
FIG. 4

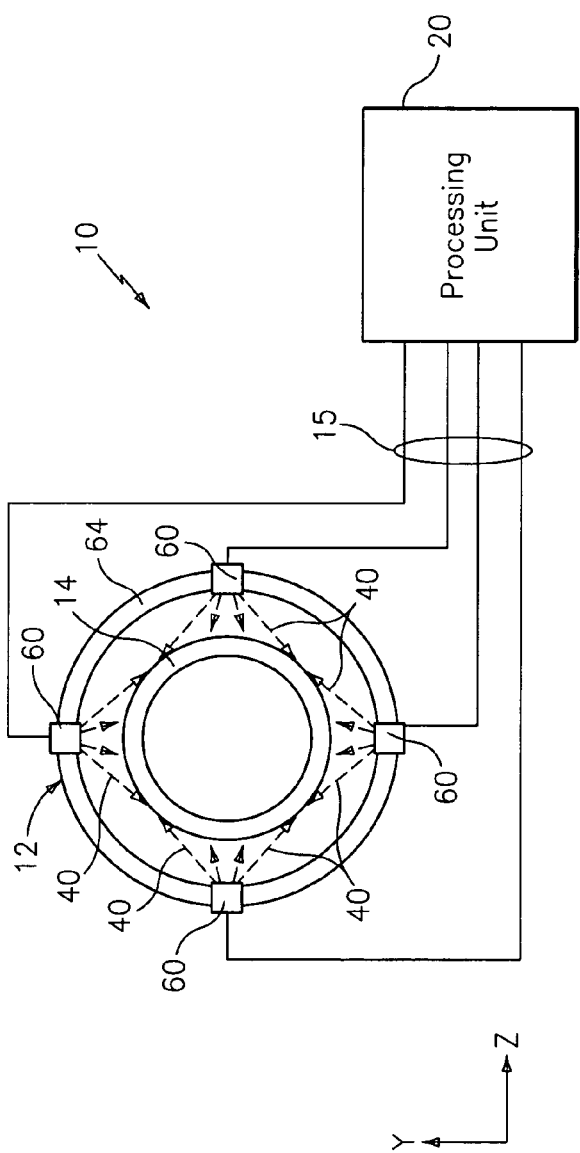
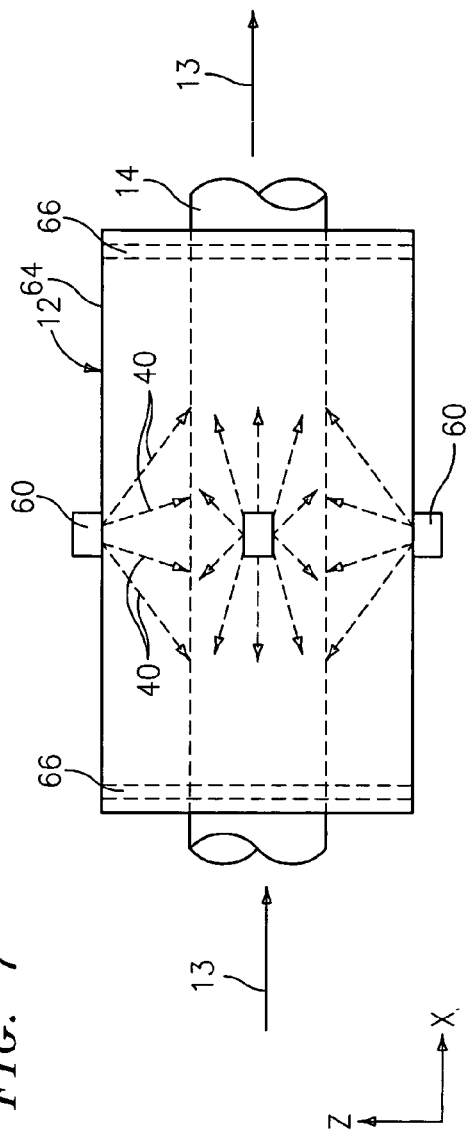
FIG. 7
FIG. 8

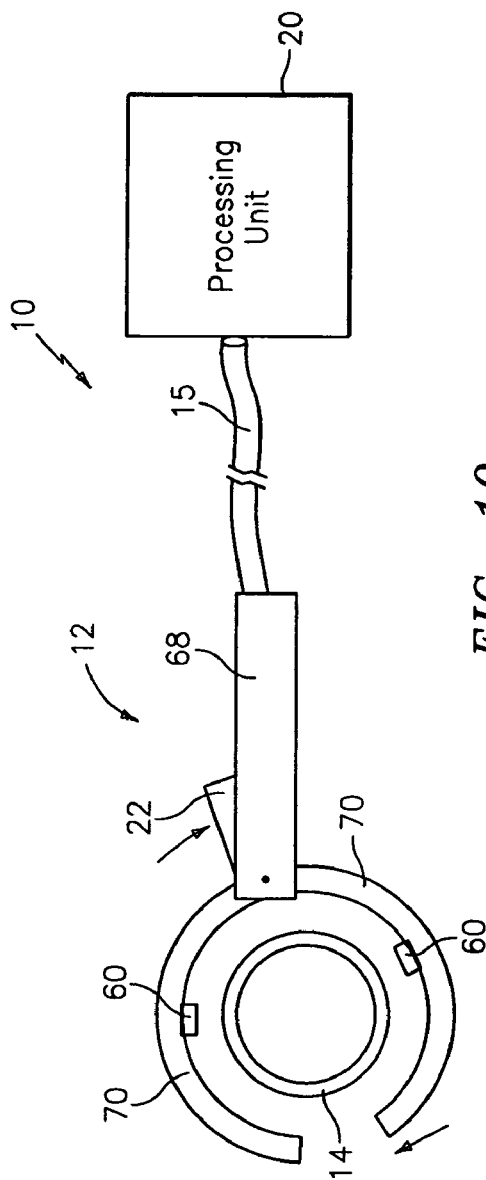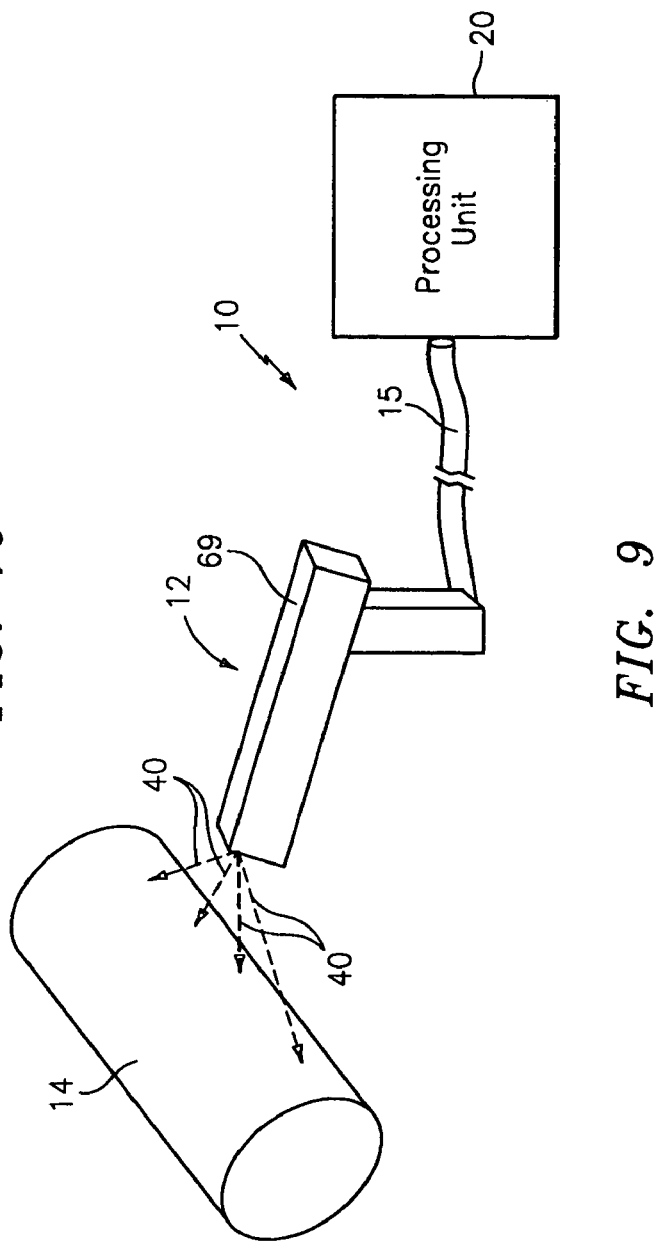
FIG. 10
FIG. 9

CHARACTERIZING UNSTEADY PRESSURES IN PIPES USING OPTICAL MEASUREMENT DEVICES

CROSS-REFERENCE TO RELATED PATENT APPLICATIONS

The present application claims the benefit of U.S. Provisional Patent Application No. 60/482,432, filed Jun. 24, 2003, which is incorporated by reference herein in their entirety.

TECHNICAL FIELD

This invention relates to an apparatus for measuring at least one parameter associated with a fluid flowing within a pipe, and more particularly to an apparatus using an optical measurement device for characterizing unsteady pressures in the fluid for use in determining parameters of the flow process, such as volumetric flow rate, composition, velocity, mass flow rate, density and particle size of the fluid and health of a diagnosed component of the flow process.

BACKGROUND

A fluid flow process (flow process) includes any process that involves the flow of fluid through pipes, ducts, or other conduits, as well as through fluid control devices such as pumps, valves, orifices, heat exchangers, and the like. Flow processes are found in many different industries such as the oil and gas industry, refining, food and beverage industry, chemical and petrochemical industry, pulp and paper industry, power generation, pharmaceutical industry, and water and wastewater treatment industry. The fluid within the flow process may be a single phase fluid (e.g., gas, liquid or liquid/liquid mixture) and/or a multi-phase mixture (e.g. paper and pulp slurries or other solid/liquid mixtures). The multi-phase mixture may be a two-phase liquid/gas mixture, a solid/gas mixture or a solid/liquid mixture, gas entrained liquid or a three-phase mixture.

Various sensing technologies exist for measuring various physical parameters of single and/or multiphase fluids in an industrial flow process. Such physical parameters include, for example, volumetric flow rate, composition, consistency, density, and mass flow rate.

In certain sensing applications, such as in industrial flow processes, it may be desirable to sense these parameters at different times and at different locations throughout the industrial flow process. For example, it may be desirable to periodically and temporarily sense volumetric flow at various locations to check the health and performance of the flow process. It may also be desirable to periodically validate the output of various meters throughout the flow process. Such requirements give rise to the need for a sensing device that is easily attached to the pipe and is portable from one location to another. Problematically, many sensors must be placed in contact with the fluid and, as a result, cannot be installed without shutting down a portion of the flow process to install the sensors.

Various non-intrusive sensors have been developed, which are attached to the surface of the pipe. Such sensors include, for example, the ultrasonic transmitter and receiver found in ultrasonic flow meters. While ultrasonic flow meters perform well for certain applications, they are generally limited to use with certain fluid types and/or temperatures. Moreover, precise alignment of the ultrasonic transmitter and receiver pair is required, which may not lend itself to instrument portability and adaptability to different pipe sizes.

Thus, there remains a need for a non-invasive sensor for measuring various parameters of single and/or multiphase fluids in an industrial flow process that can be used with high-temperature applications and which may be portable from one location to another.

SUMMARY OF THE INVENTION

The above-described and other needs are met by a method and apparatus for measuring at least one parameter associated with a fluid flowing within a pipe. The apparatus comprises an optical measurement device and a signal processor. The optical measurement device provides output signals indicative of unsteady pressures within the fluid at two or more axial locations along the pipe in response to light reflected from an outer surface of the pipe. The signal processor provides an output signal indicative of at least one parameter associated with the fluid flowing within the pipe in response to the output signals from the optical measurement device. The optical measurement device may include, for example, an electronic speckle pattern interferometer, a Fabry-Perot device, and/or a laser vibrometer. The at least one parameter may include at least one of: density of the fluid, volumetric flow rate of the fluid, mass flow rate of the fluid, composition of the fluid, entrained air in the fluid, consistency of the fluid, size of particles in the fluid, and health of a device causing the unsteady pressures to be generated in the pipe.

In one embodiment, the optical measurement device directs one or more laser beam discretely at the two or more locations to provide the light reflected from the outer surface of the pipe. In another embodiment, the optical measurement device scans one or more laser beam axially along the pipe to provide the light reflected from the outer surface of the pipe. In this embodiment, the output signals from the optical measurement device may include a plurality of readings taken axially across the pipe, and the signal processor may select the readings taken at the two or more locations. In another embodiment, the optical measurement device scans one or more laser beam radially across the pipe at each of the two or more locations to provide the light reflected from the outer surface of the pipe. In this embodiment, the output signals from the optical measurement device may include a plurality of readings taken radially across the pipe at each of the two or more locations, and the signal processor may average the plurality of readings at each of the two or more locations to compensate for bending modes caused by the flexing of the pipe.

In yet another embodiment, the optical measurement device projects defocused laser light onto the pipe to provide the light reflected from the outer surface of the pipe. In this embodiment, the output signals from the optical measurement device are indicative of unsteady pressures within the fluid at multiple locations throughout an area of the pipe onto which the defocused laser light is projected. The signal processor may process only a portion of the output signals from the optical measurement device. Also in this embodiment, the output signals from the optical measurement device may include a plurality of readings taken radially across the pipe at each of the two or more locations, and the signal processor may average the plurality of readings at each of the two or more locations to compensate for bending modes caused by the flexing of the pipe. Also in this embodiment, the output signals from the optical measurement device may include a plurality of readings taken axially along the pipe, and the signal processor may select the readings taken at the two or more locations.

In various embodiments, a flange extends radially from the pipe, and the optical measurement device reflects light off of the flange to compensate for whole body motion of the pipe. In another embodiment, the optical measurement device emits laser light from two or more devices disposed axially along and/or radially around the pipe. The optical measurement device may be handheld or may be attached to the pipe.

The foregoing and other objects, features and advantages of the present invention will become more apparent in light of the following detailed description of exemplary embodiments thereof.

BRIEF DESCRIPTION OF THE DRAWINGS

Referring now to the drawing wherein like elements are numbered alike in the various Figures:

FIG. 3 is schematic diagram of an apparatus for measuring at least one parameter associated with a fluid flowing within a pipe using an optical measurement device for characterizing unsteady pressures in the fluid, in accordance with a second embodiment of the present invention.

FIG. 4 depicts portions of the pipe that may be measured by the apparatus of FIG. 3.

FIG. 7 is schematic diagram of an apparatus for measuring at least one parameter associated with a fluid flowing within a pipe using an optical measurement device for characterizing unsteady pressures in the fluid, in accordance with a fourth embodiment of the present invention.

FIG. 8 is a side elevation view of the optical measurement device of FIG. 7.

FIG. 9 depicts a handheld optical measurement device.

FIG. 10 depicts an alternative handheld optical measurement device.

DETAILED DESCRIPTION

As described in U.S. patent application Ser. No. 10/007, 749, Ser. No. 10/349,716, Ser. No. 10/376,427, which are all incorporated herein by reference, unsteady pressures along a pipe, as may be caused by one or both of acoustic waves propagating through the fluid within the pipe and/or pressure disturbances that convect with the fluid flowing in the pipe (e.g., turbulent eddies and vortical disturbances), contain useful information regarding parameters of the fluid and the flow process. This disclosure describes an apparatus for measuring at least one parameter associated with a fluid flowing within a pipe, where the apparatus includes an optical measurement device that, in response to light reflected from an outer surface of the pipe, provides output signals indicative of unsteady pressures within the fluid at two or more locations axially along the pipe. The apparatus determines the at least one parameter in response to the output signals from the optical measurement device. As will be described in further detail hereinafter, the optical measurement device may include one or more of an electronic speckle pattern interferometer, a laser vibrometer, and a Fabry-Perot interferometer. Advantageously, the apparatus is a non-invasive, can be used for measuring various parameters of single and/or multiphase fluids, and may be portable from one location to another. Moreover, because the apparatus need not contact the pipe, the apparatus may be used in high and low temperature applications.

Figure 1:
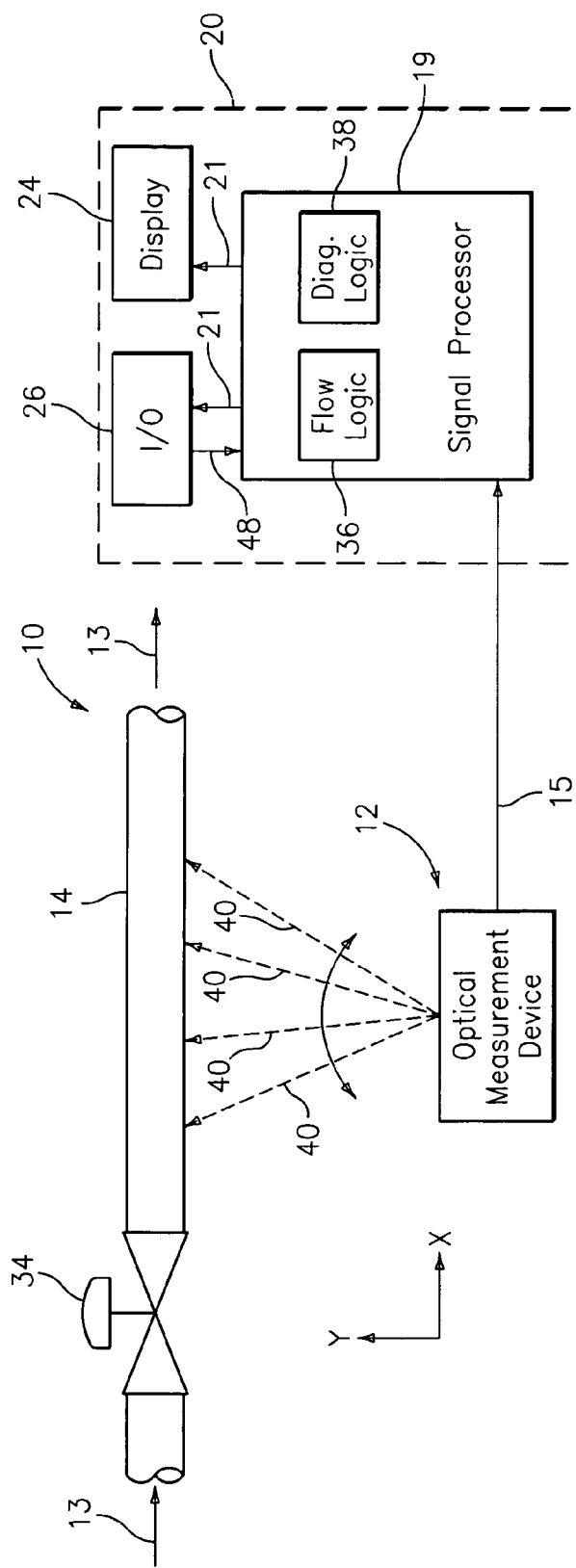
FIG. 1 is schematic diagram of an apparatus for measuring at least one parameter associated with a fluid flowing within a pipe using an optical measurement device for characterizing unsteady pressures in the fluid, in accordance with a first embodiment of the present invention.
Figure 2:
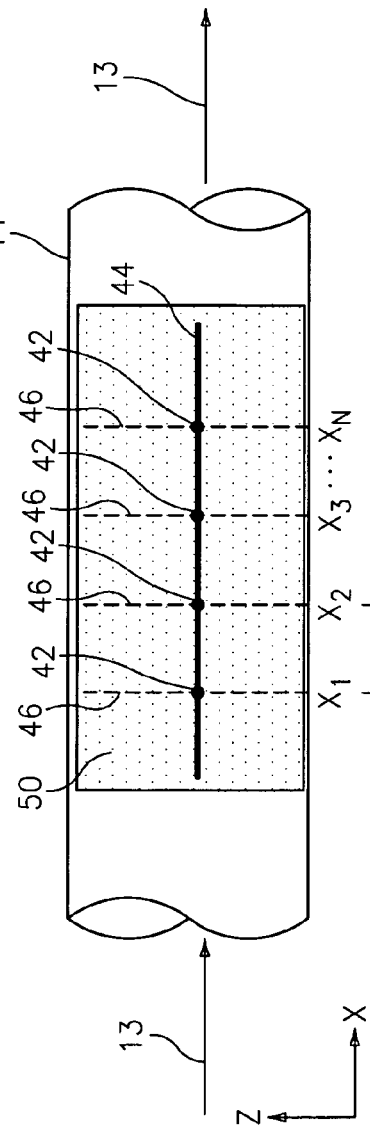
FIG. 2 depicts portions of the pipe that may be measured by the apparatus of FIG. 1.

Referring to FIGS. 1 and 2, a flowmeter (apparatus) 10 includes an optical measurement device 12 arranged to measure unsteady pressures within a fluid 13 flowing in a pipe 14 at two or more locations $x_1 \ldots x_N$ axially along the pipe 14. The optical measurement device 12 measures the unsteady pressures by detecting the displacement, strain, velocity, or acceleration of the pipe wall caused by the pressure fluctuations within the pipe 14. The optical measurement device outputs (in series or parallel) signals $P_1(t) \ldots P_N(t)$, which are indicative of the unsteady pressures at each of the two or more locations $x_1 \ldots x_N$, respectively. Alternatively, the optical measurement device 12 may output an array of signals indicative of the unsteady pressures at each of the two or more locations $x_1 \ldots x_N$ (i.e., $P_{1,1}(t)-P_{1,Z}(t) \ldots P_{N,1}(t)-P_{N,Z}(t)$). In either case, these output signals, as indicated at 15 in FIG. 1, are provided to a processing unit 20, which processes the output signals 15 to provide a signal indicative of at least one parameter (parameter) 21 of the flow process, as will be described in further detail hereinafter.

The signals 15 provided by the optical measurement device are processed by a signal processor 19 within the processing unit 20. The signal processor 19 applies this data to flow logic 36 executed by signal processor 19 to determine one or more parameters 21 of the flow process, such as volumetric flow rate, mass flow rate, density, composition, entrained air, consistency, particle size, velocity, mach number, speed of sound propagating through the fluid 13, and/or other parameters of the fluid 13. The flow logic 36 is described in further detail hereinafter.

The signal processor 19 may also apply one or more of the signals 15 and/or one or more parameters 21 from the flow logic 36 to diagnostic logic 38. Diagnostic logic 38 is executed by signal processor 19 to diagnose the health of any device 34 in the process flow that causes unsteady pressures to be generated in the pipe 14. In FIG. 1, device 34 is depicted as a valve; however, it is contemplated that device 34 may be any machinery, component, or equipment, e.g., motor, fan, pump, generator, engine, gearbox, belt, drive, pulley, hanger, clamp, actuator, valve, meter, or the like. The signal processor 19 may output one or more parameters 21 indicative of the health of the diagnosed device 34. The diagnostic logic 38 is described in further detail hereinafter.

The signal processor 19 may be one or more signal processing devices for executing programmed instructions, such as one or more microprocessors or application specific integrated circuits (ASICS), and may include memory for storing programmed instructions, set points, parameters, and for buffering or otherwise storing data. For example, the signal processor 19 may be a microprocessor and the processing unit 20 may be a personal computer or other general purpose computer.

The one or more parameters 21 may be output to a display 24 or another input/output (I/O) device 26. The I/O device 26 also accepts user input parameters 48 as may be necessary for the flow logic 36 and diagnostic logic 38. The I/O device 26, display 24, and signal processor 19 unit may be mounted in a common housing, which may be attached to the optical measurement device 12 by a flexible cable, wireless connection, or the like. The flexible cable may also be used to provide operating power from the processing unit 20 to the optical measurement device 12 if necessary.

The optical measurement device 12 may include any device capable of detecting displacement, strain, velocity, or acceleration of the pipe wall using light reflected from a surface to be measured. For example, the optical measurement device 12 may include a laser vibrometer, an electronic speckle pattern interferometer, or a Fabry-Perot interferometer.

As used herein, a laser vibrometer is a measurement device wherein one or more light beams, which may be pulsed, are emitted onto the surface to be measured. Light scattered or reflected off the surface is collected using an optical arrangement that uses any known technique (e.g., Laser-Doppler vibrometer techniques) to detect a difference (e.g., a frequency shift) between the collected light and one or more reference beams or to detect an elapsed time between emission and reception of the beam. For example, light scattered or reflected off the surface may be collected using an optical arrangement that then mixes this light with a "local oscillator (LO)" signal that is directly derived from the laser source. Typically, the direct LO signal is frequency shifted, such that the "signal" and the LO signal produces a heterodne "beat" signal that can be detected easily using frequency modulation (FM) electronics. The vibration of the pipe surface is transported into the phase of the heterodyne signal, and sensitive motion of the surface can be monitored.

The laser vibrometer may include a single laser beam to measure vibrations of the surface to be measured in the direction of the laser beam (e.g., single point or "out of plane" vibrometers). The laser vibrometer may include two or more laser beams intersecting at the focus point to measure vibrations in more than one dimension (e.g., three dimensional (3D) vibrometers), and the laser vibrometer may map or scan the surface to be measured (e.g., scanning vibrometers and 3D mapping vibrometers). The one or more laser beams may be directed to one or more discrete measurement points, or the one or more laser beams may be scanned or mapped in two or three dimensions across the surface. Laser vibrometers such as those commercially available from Polytec GmbH, Waldbronn, Germany may be used.

As used herein, an electronic speckle pattern interferometer (ESPI) is a measurement configuration device wherein one or more defocused light beams, which may be pulsed, are projected onto the surface to be measured. Light scattered or reflected off the surface is collected using an optical arrangement that uses any known technique to detect a difference (e.g., a frequency shift) between the collected light and one or more reference beams at each point in an image plane. For example, ESPIs such as those commercially available from Trillion Quality Systems, LLC, Southeastern, Pennsylvania, or from Syncretek LLC, McLean, Va. may be used.

In the embodiment of FIGS. 1 and 2, the optical measurement device 12 emits light as one or more beams 40 onto an outer surface of the pipe 14. In one configuration, the beams 40 may be discretely directed at points 42 at each of the locations $x_1, x_2, x_3, \ldots x_N$ to measure displacement, strain, velocity, or acceleration at these points 42. In response, optical measurement device 12 outputs signals 15 ($P_1(t), P_2(t), P_3(t) \ldots P_N(t)$) to processing unit 20. In this configuration, for example, one or more laser vibrometers (e.g., one or more single point, 3D, or scanning vibrometers) may be used. In the embodiment shown, the points 42 are equally spaced at a distance "d", which may be about 6 inches. It is also contemplated that uneven spacing may be used. Preferably, the optical measurement device 12 is configured to allow adjustment of the distance "d".

Alternatively, the optical measurement device 12 may scan one or more laser beam axially along the pipe, as indicated at line 44, to measure displacement, strain, velocity, or acceleration at a relatively large number of axial locations $x_1, x_2, x_3, \ldots x_N$. In this configuration, for example, a scanning vibrometer may be used. Advantageously, this configuration allows the signal processor 19, or operating personnel via the input signal 48 from I/O device 26, to choose the "spacing" between each of the measurements. That is, because of the relatively large number of locations $x_1, x_2, x_3, \ldots x_N$ at which measurements are taken, certain ones of the locations $x_1, x_2, x_3, \ldots x_N$ (i.e. certain ones of the signals $P_1(t), P_2(t), P_3(t) \ldots P_N(t)$) may be selected as input for use by the flow logic 36 in calculating the parameters 21. This allows the spacing between each of the measurements to be selected "on the fly" to accommodate certain flow conditions or fluids, without having to manually adjust the optical measurement device 12.

In another alternative configuration, the optical measurement device 12 may scan one or more light beam radially across the pipe 14 at each of the locations $x_1, x_2, x_3, \ldots x_N$, as indicated at lines 46, to measure displacement, strain, velocity or acceleration along lines 46. In this configuration, for example, one or more scanning vibrometers may be used. As will be appreciated, such scanning will result in N arrays of measurements: $P_{1,1}(t)$–$P_{1,Z}(t)$; $P_{2,1}(t)$–$P_{2,Z}(t)$; $P_{3,1}(t)$–$P_{3,Z}(t)$ . . . $P_{N,1}(t)$–$P_{N,Z}(t)$. Using this data, the signals processor 19, or logic within the optical measurement device 12, may compute an average measurement for each of the N arrays and provide the averages as input signals $P_1(t)$, $P_2(t)$, $P_3(t)$, . . . $P_N(t)$ to the flow logic 36. Advantageously, by taking the average measurement along each axial position, errors associated with vibration or bending modes of the pipe 14 can be reduced. As in the previous configurations, the distance "d" is preferably adjustable.

In yet another alternative configuration, the optical measurement device 12 may measure displacement, strain, velocity or acceleration at multiple locations within an area on the surface of the pipe 14, as indicated at 50. In this configuration, for example, one or more 3D mapping vibrometers or ESPIs may be used. This configuration provides all the advantages described with respect to the previous configurations. That is, this configuration will result in a relatively large number of locations $x_1$, $x_2$, $x_3$, . . . $x_N$ for which data is available. As a result, the signal processor 19 (or an operating personnel via an input signal 48 from I/O device 26) may choose the "spacing" between each of the measurements without having to manually adjust the optical measurement device 12. In addition, this configuration will result in an array of measurements for each of these locations $x_1$, $x_2$, $x_3$, . . . $x_N$, which may be averaged to reduce the errors associated with vibration or bending modes of the pipe 14.

Referring to FIG. 3 and FIG. 4, an embodiment is shown which utilizes multiple beam interrogation at each axial location $x_1$, $x_2$, $x_3$, . . . $x_N$. As previously discussed with reference to FIGS. 1 and 2, one or more beams 40 are emitted from the optical measurement device 12 onto the surface of the pipe 14. In addition, two reference beams 52 are emitted from the optical measurement device 12 onto flanges 54, which extend radially from the pipe 14. In this embodiment, the whole body displacement of pipe 14 is monitored through a measurement of the pipe 14 deflection at its edges (via the flanges 54 using reference beams 52) whereas the composite whole-body plus pipe displacements are measured using the sensing beam 40. The difference between the measurements from the beam 40 and the reference beams 52, which may be determined by the processing unit 20, provides a clean measurement of the pipe wall displacement, and thus the unsteady pressures within the fluid 13. In effect, the use of multiple beams 40 and 52 allows for the compensation of bending modes and vibration of the pipe 14. As in the embodiment described with reference to FIGS. 1 and 2, the beam 40 may be discretely directed at points 42, or may be scanned axially along the pipe, as indicated at line 44. Similarly, the beams 52 may be discretely directed at points 56, or may be scanned axially along the pipe 14, as indicated at line 58.

Figure 5:
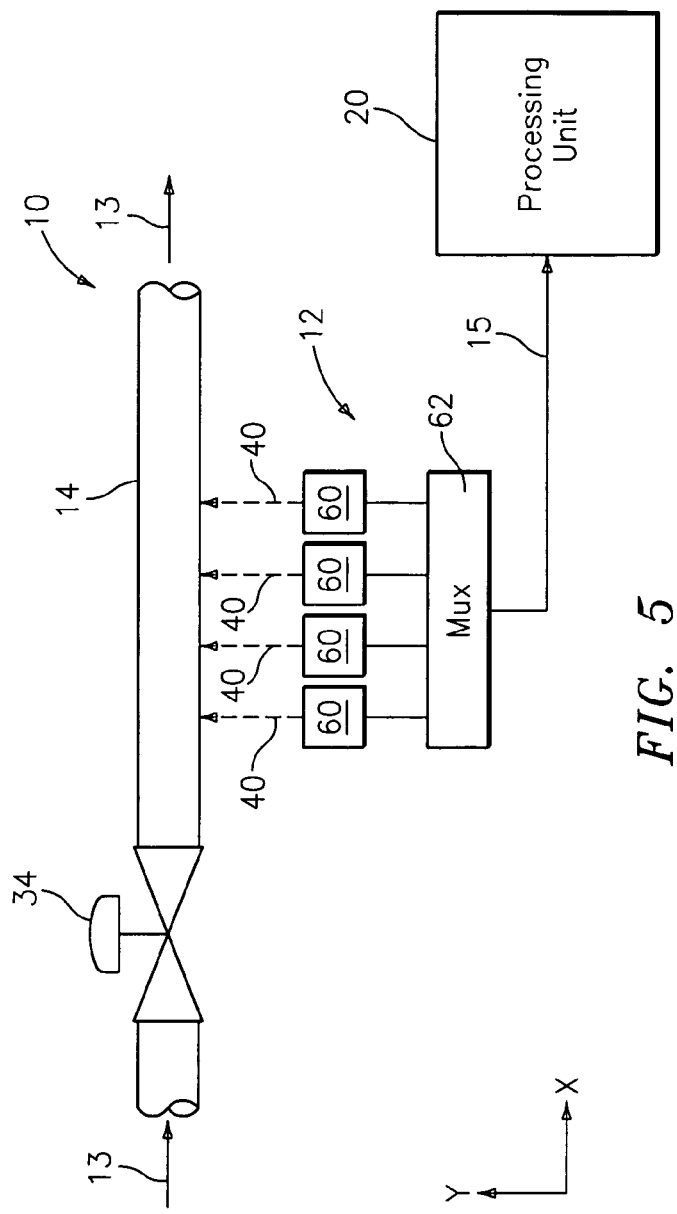
FIG. 5 is schematic diagram of an apparatus for measuring at least one parameter associated with a fluid flowing within a pipe using an optical measurement device for characterizing unsteady pressures in the fluid, in accordance with a third embodiment of the present invention.
Figure 6:
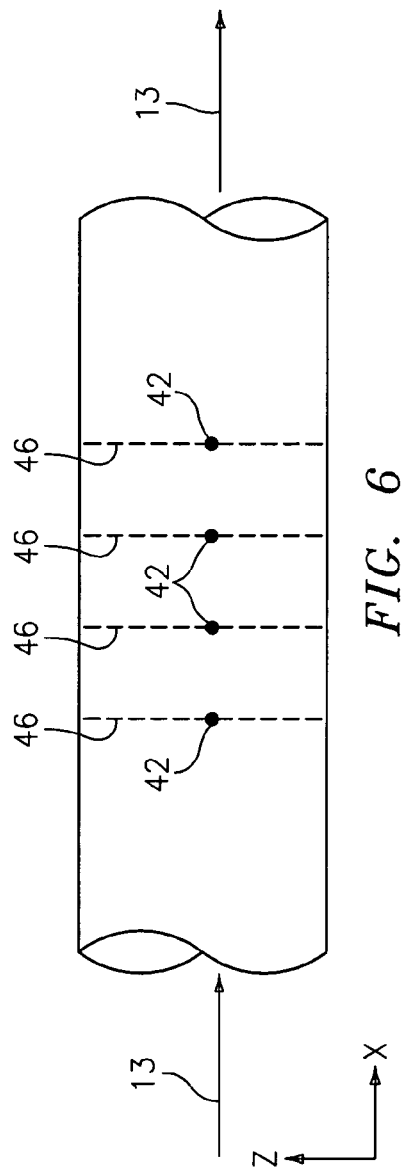
FIG. 6 depicts portions of the pipe that may be measured by the apparatus of FIG. 5.

Referring to FIGS. 5 and 6, an embodiment is shown wherein the optical measurement device 12 emits at least one light beam 40 from each of two or more devices 60 disposed axially along the pipe 14. In this embodiment, for example, each beam 40 may be discretely directed at points 42, or may be scanned radially across the pipe 14 at each of the locations $x_1$, $x_2$, $x_3$, . . . $x_N$, as indicated at lines 46, to measure displacement, strain, velocity or acceleration of the pipe wall. Preferably each of the devices 60 is a laser vibrometer, such as, for example, one or more single point, 3D, or scanning vibrometers. However, the devices 60 may include one or more ESPI. The output signals from each of the devices 60 may be provided to a multiplexer 62, which outputs the multiplexed signal 15 to the processing unit 20.

Referring to FIGS. 7 and 8, an embodiment is shown wherein the optical measurement device 12 emits at least one light beam 40 from each of two or more devices 60 disposed radially around the pipe 14. In this embodiment, each of the devices 60 is secured to a shell 64 disposed concentrically around the pipe 14. Preferably, the shell 64 is thermally insulated from the pipe 14 to prevent damage to the devices 60 due to extreme temperatures at the pipe 14. For example, the shell may be coupled to the pipe 14 using rings 66 constructed of an insulating material (e.g., rubber). Each of the devices 60 may be an ESPI, the output signals from each of which are provided to processing unit 20. The processing unit 20 may take the average of each measurement at each of the locations $x_1$, $x_2$, $x_3$, . . . $x_N$ to reduce errors associated with vibration or bending modes of the pipe 14. While devices 60 are shown as ESPIs, it is contemplated that laser vibrometers may be used for devices 60 in FIGS. 7 and 8. It is also contemplated that a combination of the embodiments of FIGS. 5, 6, 7, and 8 may be employed, where a plurality of devices 60 are disposed radially around the pipe 14 at two or more axial locations along the pipe 14.

FIGS. 9 and 10 depict handheld optical measurement devices 12. In the embodiment of FIG. 9, the optical measurement device 12 is in the form of a gun 69 or other handheld device that can be directed toward a location on the pipe 14 to be measured. In the embodiment of FIG. 10, the optical measurement device 12 includes a handle 68 from which two opposing, semi-circular portions 70 depend. At least one of the portions 70 includes at least one device 60 disposed thereon, which may be ESPIs or laser vibrometers. One of the semi-circular portions is hinged to the handle 60, and is attached to a lever 72. Actuation of the lever 72 in the direction of arrow 74 causes the hinged portion 70 pivot in the direction indicated by arrow 76 and close around the pipe 14 to place the one or more devices in position for taking measurements.

The handheld optical measurement devices 12 of FIG. 9 or FIG. 10, accompanied by a portable processing unit 20, allows a field technician to transport the flowmeter 10 to various locations in an industrial flow process for measuring various parameters of the fluid 13 and/or for monitoring the health of devices 34 in the flow process.

Figure 11:
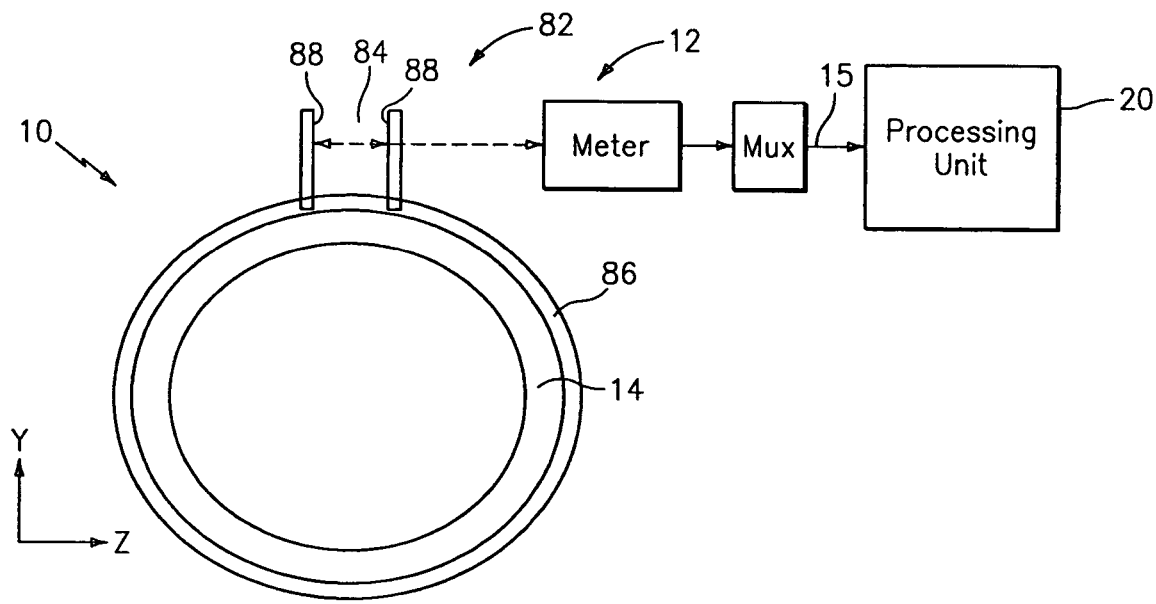
FIG. 11 is a front elevation schematic view of an apparatus for measuring at least one parameter associated with a fluid flowing within a pipe using an optical measurement device for characterizing unsteady pressures in the fluid, in accordance with a fifth embodiment of the present invention.
Figure 12:
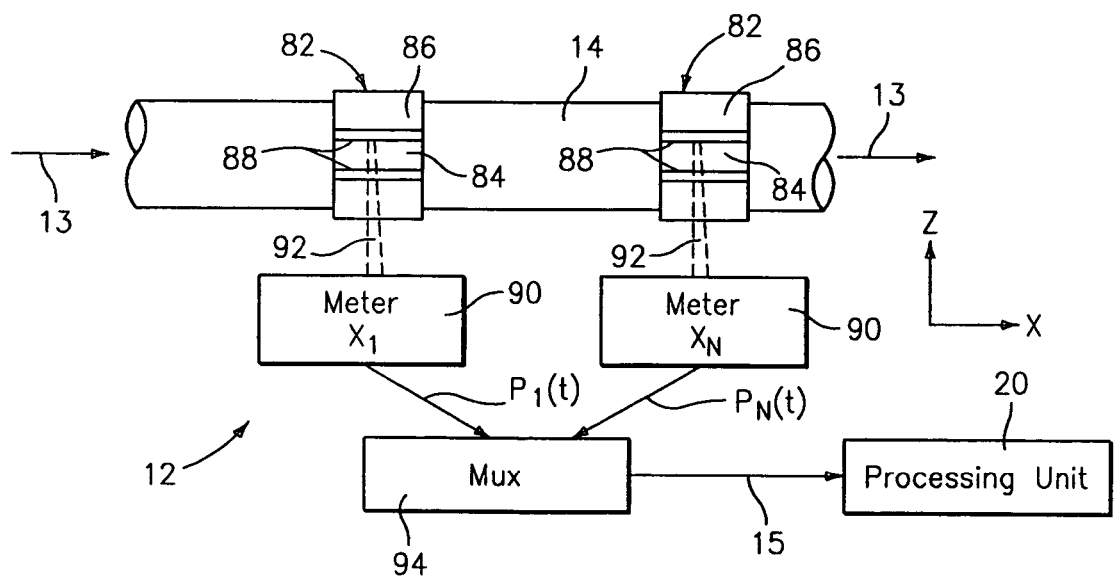
FIG. 12 is a side elevation schematic view of the apparatus of FIG. 11.

FIGS. 11 and 12 depict a flowmeter 10 wherein the optical measurement device 12 includes two or more Fabry-Perot devices 82, each having a cavity 84 coupled to the pipe 14 via a strap 86 at a respective measurement location (e.g., $x_1$). Similar devices 82 would be provided at other locations (e.g., $x_2$, $x_3$, . . . $x_N$). In each Fabry-Perot device 82 the strap 86 is disposed around the pipe 14, with the strap 86 having a pair of opposing, spaced-apart, surfaces 88 extending therefrom and forming the cavity 84. One surface 88 may be fully mirrored, the other surface 88 partially mirrored. Each device 82 has a meter 90, which provides an incident light beam 92 into the cavity 84 and receives light transmitted from the cavity 92. Within the meter 90, the light passes through various optical devices (e.g., lenses, Bragg gratings, etc.) and onto an optical detector (e.g., charged-coupled device (CCD)) where interference fringes are detected by the meter 90. Displacement of one of the surfaces 88 relative to the other surface 88, as would be caused by expansion and contraction (breathing) of the pipe 14 due to unsteady pressures within the pipe 14, causes a change in the interference fringes. The meter 90 interprets this change into a corresponding displacement of the pipe, which is provided as an output signal $P_N(t)$ to a multiplexer 94. The multiplexer 94 multiplexes the signals received from each of the meters 90 and provides the multiplexed signals $P_1(t)$, $P_2(t)$, $P_3(t)$, ... $P_N(t)$ to the processing unit 20. Advantageously, because the displacement of the surfaces 88 is the result of the expansion or contraction of the strap 86, which extends around the pipe 14, the resulting signal $P_N(t)$ is a circumferential average of the displacement of the pipe wall at the axial location N.

Diagnostic Logic

Figure 13:
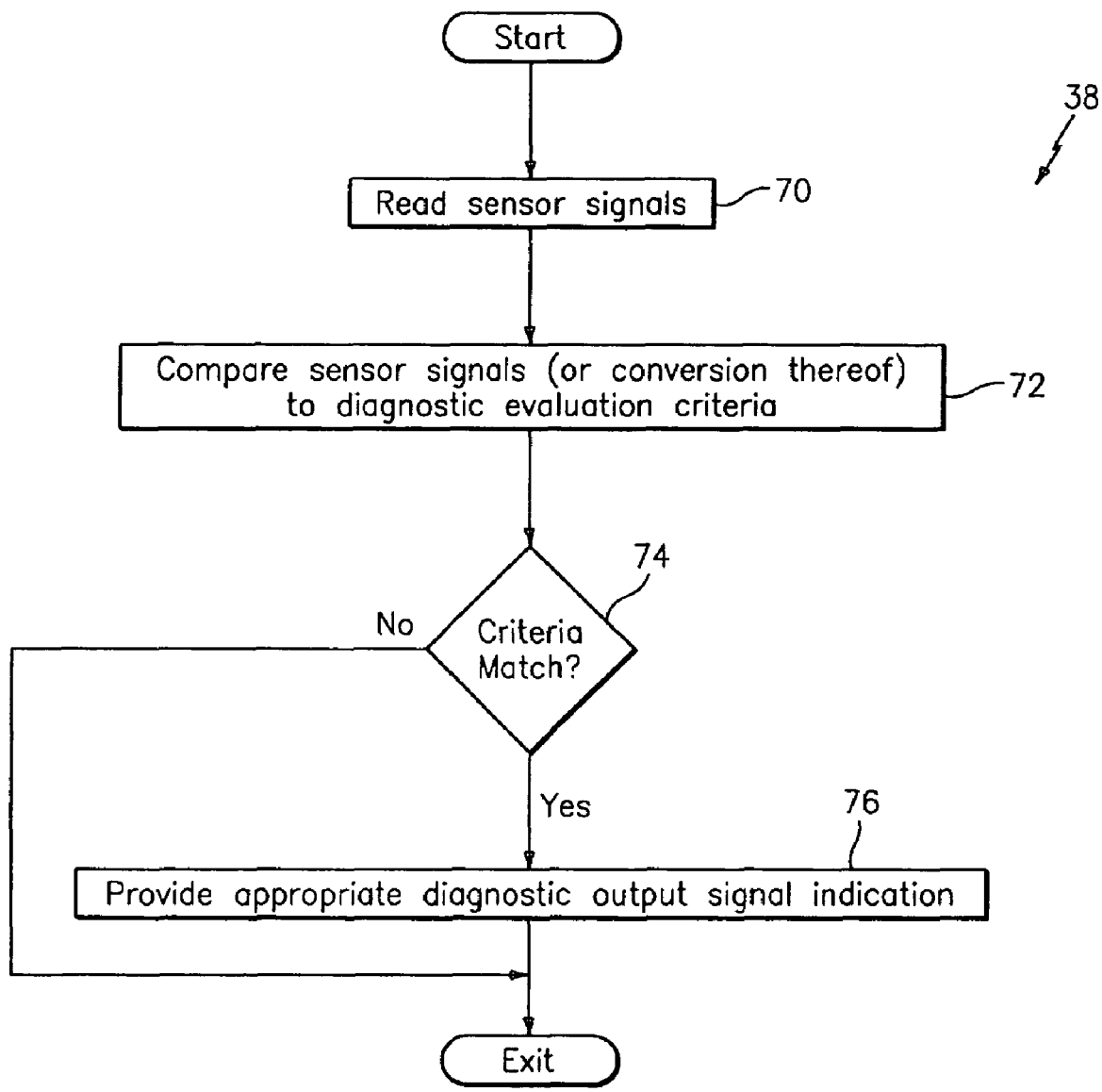
FIG. 13 is a flow chart depicting operation of a diagnostic logic used in the apparatus of the present invention.

Referring to FIG. 13, the diagnostic logic 38 measures the sensor input signals (or evaluation input signals), which may include one or more of the signals $P_1(t)$, $P_2(t)$, $P_3(t)$, $P_4(t)$ and the parameters 21, at a step 70. Next, the diagnostic logic 38 compares the evaluation input signals to a diagnostic evaluation criteria at a step 72, discussed hereinafter. Then, a step 74 checks if there is a match, and if so, a step 76 provides a diagnostic signal indicative of the diagnostic condition that has been detected and may also provide information identifying the diagnosed device. The diagnostic signal may be output as a parameter 21.

Where the evaluation input signal is a parameter 21, as may be output from the flow logic 36, the diagnostic evaluation criteria may be based on a threshold value of the flow signal 24. For example, the threshold value may be indicative of a maximum or minimum sound speed, mach number, consistency, composition, entrained air, density, mass flow rate, volumetric flow rate, or the like. If there is not a criteria match in step 74, the diagnostic logic 38 exits.

Where the evaluation input signal includes one or more signals $P_1(t)$, $P_2(t)$, $P_3(t)$, $P_4(t)$, the diagnostic evaluation criteria may be a threshold (maximum or minimum) pressure. Alternatively, the diagnostic evaluation criteria may be based on an acoustic signature, or a convective property (i.e., a property that propagates or convects with the flow). For example, the diagnostic logic 38 may monitor the acoustic signature of any upstream or downstream device (e.g., motor, fan, pump, generator, engine, gear box, belt drive, pulley, hanger, clamp, actuator, valve, meter, or other machinery, equipment or component). Further, the data from the optical measurement device 12 may be processed in any domain, including the frequency/spatial domain, the temporal/spatial domain, the temporal/wave-number domain, or the wave-number/frequency (k-ω) domain or other domain, or any combination of one or more of the above. As such, any known array processing technique in any of these or other related domains may be used if desired.

For example, for three unsteady pressure signals, the equations in the frequency/spatial domain equation would be:

$$P(x,\omega) = Ae^{-ik_r x} + Be^{+ik_l x};$$

the temporal/spatial domain would be:

$$P(x,t) = (Ae^{-ik_r x} + Be^{+ik_l x})e^{i\omega t};$$

and the k-ω domain (taking the spatial Fourier transform) would be:

$$P(k,\omega) = \frac{1}{2\pi}\int_{-\infty}^{+\infty} P(x,\omega)e^{ikx}dx = A(\omega)\delta\left(k - \frac{\omega}{a}\right) + B(\omega)\delta\left(k + \frac{\omega}{a}\right)$$

where k is the wave number, a is the speed of sound of the material, x is the location along the pipe, ω is frequency (in rad/sec, where ω=2πf), and δ is the Dirac delta function, which shows a spatial/temporal mapping of the acoustic field in the k-ω plane.

Any technique known in the art for using a spatial (or phased) array of sensors to determine the acoustic or convective fields, beam forming, or other signal processing techniques, may be used to provide an input evaluation signal to be compared to the diagnostic evaluation criteria.

Flow Logic

Velocity Processing

Figure 14:
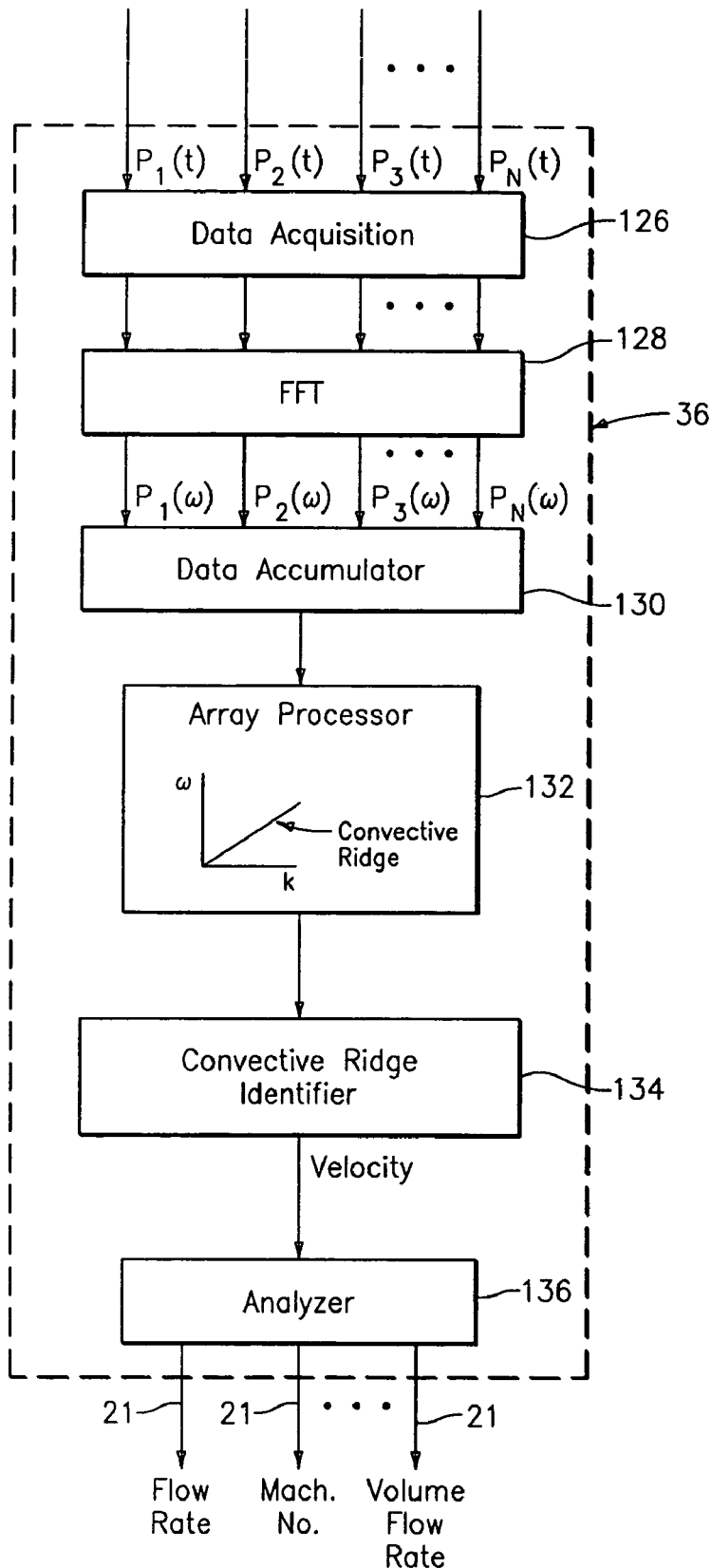
FIG. 14 is a block diagram of a first embodiment of a flow logic used in the apparatus of the present invention.
Figure 15:
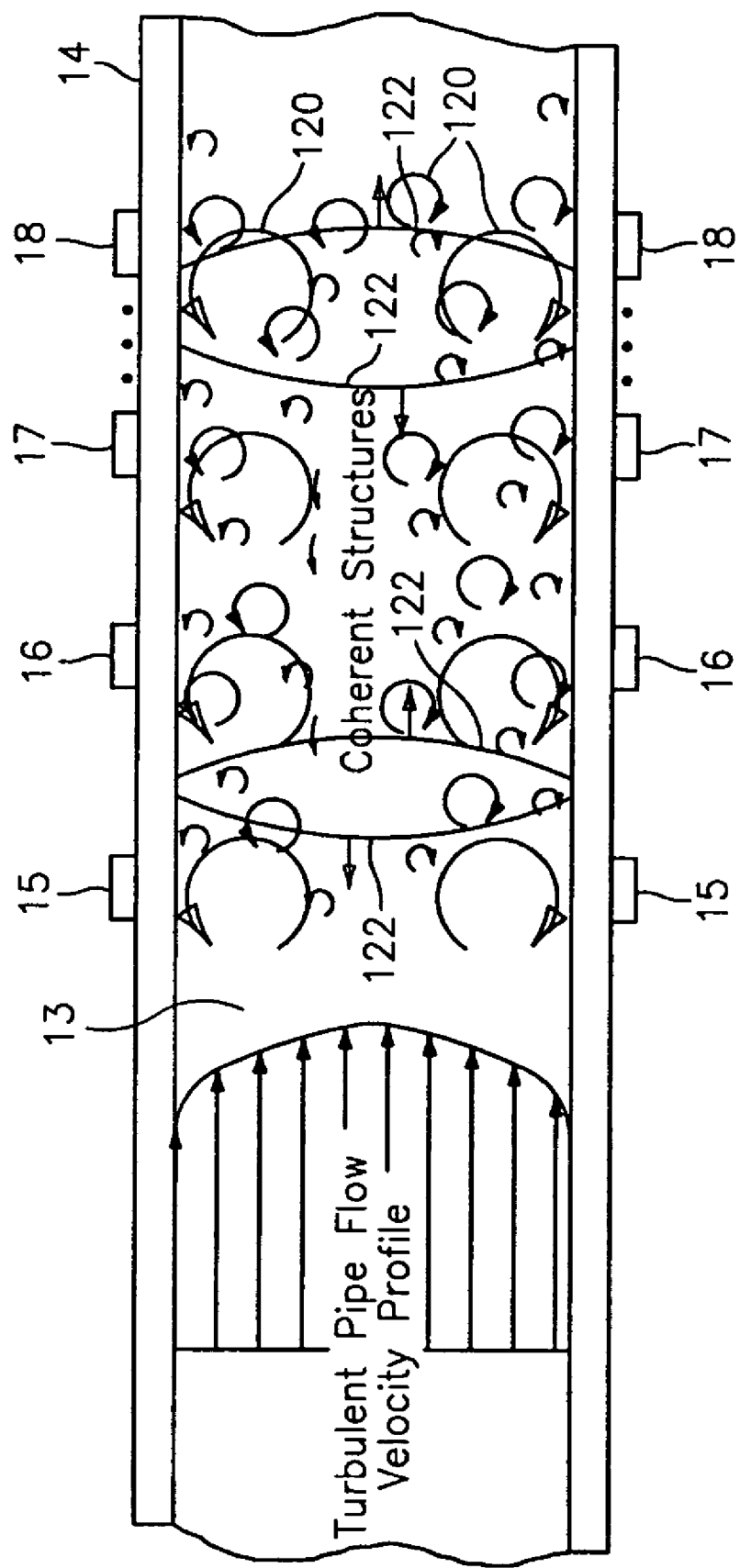
FIG. 15 is a cross-sectional view of a pipe having having coherent structures therein, in accordance with the present invention.

Referring to FIG. 14, an example of flow logic 36 is shown. As previously described, the pressure generated by the convective pressure disturbances (e.g., eddies 120, see FIG. 15) are measured by the optical measurement device 12, which provides analog pressure time-varying signals $P_1(t), P_2(t), P_3(t), P_N(t)$ to the flow logic 36. Where the optical measurement device 12 provides an array of data at each position $x_1$, $x_2$, $x_3$, ... $x_N$, (i.e., $P_{1,1}(t)-P_{1,Z}(t)$ ... $P_{N,1}(t)-P_{N,Z}(t)$) this data is first processed (e.g., averaged and/or selected as previously described) by the signal processor 19, which applies the resulting signals $P_1(t), P_2(t), P_3(t), P_N(t)$ to the flow logic 36.

The flow logic 36 processes the signals $P_1(t), P_2(t), P_3(t), P_N(t)$ to first provide output signals (parameters) 21 indicative of the pressure disturbances that convect with the fluid (process flow) 13, and subsequently, provide output signals in response to pressure disturbances generated by convective waves propagating through the fluid 13, such as velocity, Mach number and volumetric flow rate of the process flow 13. The flow logic 36 processes the pressure signals to first provide output signals indicative of the pressure disturbances that convect with the process flow 13, and subsequently, provide output signals in response to pressure disturbances generated by convective waves propagating through the process flow 13, such as velocity, Mach number and volumetric flow rate of the process flow 13.

A data acquisition unit 126 (e.g., A/D converter) converts any analog signals to respective digital signals. The FFT logic 128 calculates the Fourier transform of the digitized time-based input signals $P_1(t)-P_N(t)$ and provides complex frequency domain (or frequency based) signals $P_1(\omega), P_2(\omega), P_3(\omega), P_N(\omega)$ indicative of the frequency content of the input signals. Instead of FFT's, any other technique for obtaining the frequency domain characteristics of the signals $P_1(t)-P_N(t)$, may be used. For example, the cross-spectral density and the power spectral density may be used to form a frequency domain transfer functions (or frequency response or ratios) discussed hereinafter.

One technique of determining the convection velocity of the turbulent eddies 120 within the process flow 13 is by characterizing a convective ridge of the resulting unsteady pressures using an array of sensors or other beam forming techniques, similar to that described in U.S. patent application Ser. No. 10/007,736 and U.S. patent application Ser. No. 09/729,994 filed Dec. 4, 2000, now U.S. Pat. No. 6,609,069, which are incorporated herein by reference.

A data accumulator 130 accumulates the frequency signals $P_1(\omega)-P_N(\omega)$ over a sampling interval, and provides the data to an array processor 132, which performs a spatial-temporal (two-dimensional) transform of the sensor data, from the xt domain to the k-ω domain, and then calculates the power in the k-ω plane, as represented by a k-ω plot.

The array processor 132 uses standard so-called beam forming, array processing, or adaptive array-processing algorithms, i.e. algorithms for processing the sensor signals using various delays and weighting to create suitable phase relationships between the signals provided by the different sensors, thereby creating phased antenna array functionality. In other words, the beam forming or array processing algorithms transform the time domain signals from the sensor array into their spatial and temporal frequency components, i.e. into a set of wave numbers given by $k=2\pi/\lambda$ where $\lambda$ is the wavelength of a spectral component, and corresponding angular frequencies given by $\omega=2\pi\nu$.

The prior art teaches many algorithms of use in spatially and temporally decomposing a signal from a phased array of sensors, and the present invention is not restricted to any particular algorithm. One particular adaptive array processing algorithm is the Capon method/algorithm. While the Capon method is described as one method, the present invention contemplates the use of other adaptive array processing algorithms, such as MUSIC algorithm. The present invention recognizes that such techniques can be used to determine flow rate, i.e. that the signals caused by a stochastic parameter convecting with a flow are time stationary and have a coherence length long enough that it is practical to obtain measurements at axial positions $x_1$, $x_2$, $x_3$, ... $x_N$ and yet still be within the coherence length.

Convective characteristics or parameters have a dispersion relationship that can be approximated by the straight-line equation, $$k=\omega/u,$$

where u is the convection velocity (flow velocity). A plot of k-ω pairs obtained from a spectral analysis of sensor samples associated with convective parameters portrayed so that the energy of the disturbance spectrally corresponding to pairings that might be described as a substantially straight ridge, a ridge that in turbulent boundary layer theory is called a convective ridge. What is being sensed are not discrete events of turbulent eddies, but rather a continuum of possibly overlapping events forming a temporally stationary, essentially white process over the frequency range of interest. In other words, the convective eddies 120 is distributed over a range of length scales and hence temporal frequencies.

To calculate the power in the k-ω plane, as represented by a k-ω plot (see FIG. 16) of either the signals, the array processor 132 determines the wavelength and so the (spatial) wavenumber k, and also the (temporal) frequency and so the angular frequency ω, of various of the spectral components of the stochastic parameter. There are numerous algorithms available in the public domain to perform the spatial/temporal decomposition of arrays of sensor units 15–18.

The present invention may use temporal and spatial filtering to precondition the signals to effectively filter out the common mode characteristics $P_{common\ mode}$ and other long wavelength (compared to the sensor spacing) characteristics in the pipe 14 by differencing adjacent measurements and retain a substantial portion of the stochastic parameter associated with the flow field and any other short wavelength (compared to the sensor spacing) low frequency stochastic parameters.

Figure 16:
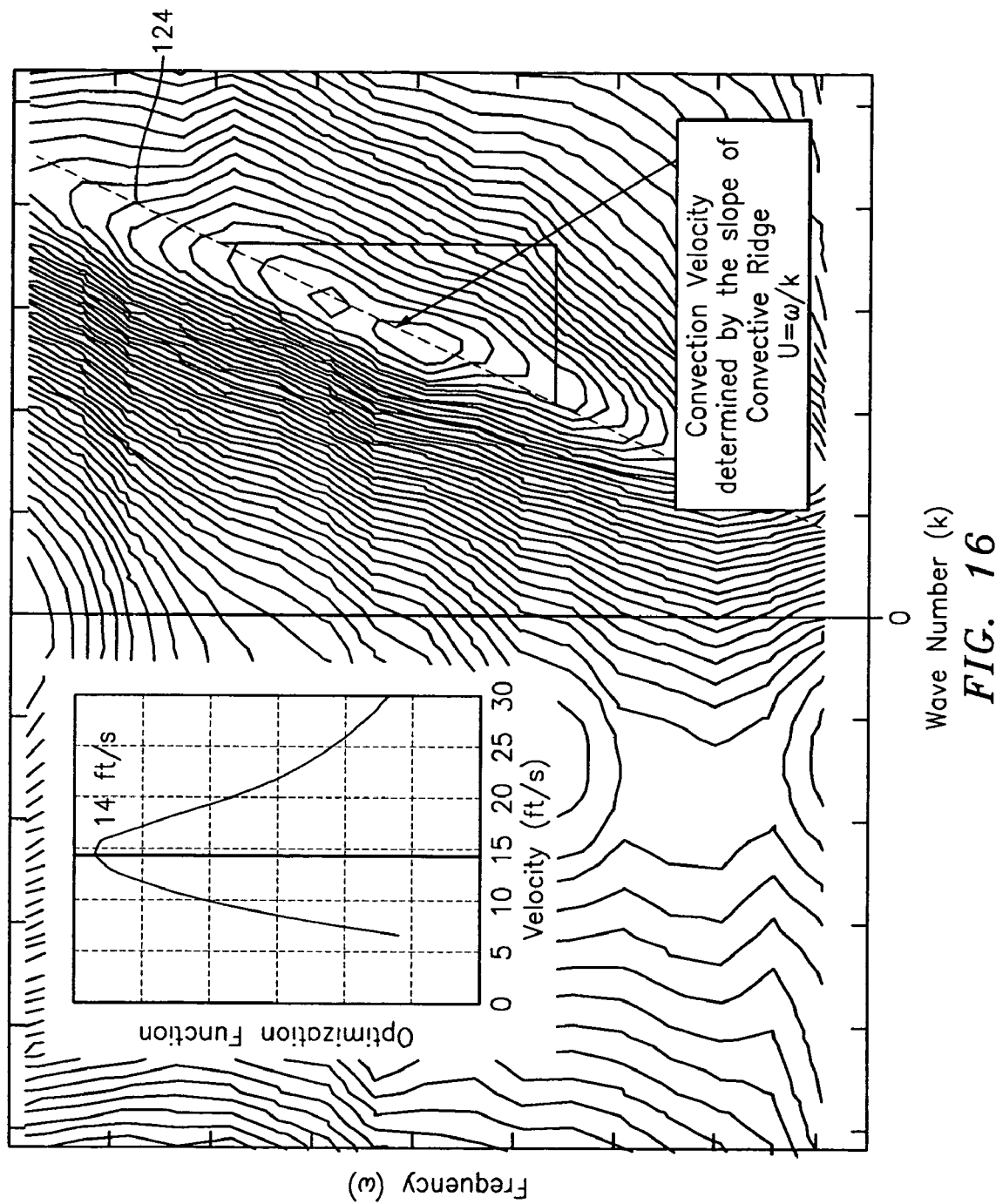
FIG. 16 a kω plot of data processed from an apparatus embodying the present invention that illustrates slope of the convective ridge, and a plot of the optimization function of the convective ridge, in accordance with the present invention.

In the case of suitable turbulent eddies 120 (see FIG. 15) being present, the power in the k-ω plane shown in a k-ω plot of FIG. 16 shows a convective ridge 124. The convective ridge represents the concentration of a stochastic parameter that convects with the flow and is a mathematical manifestation of the relationship between the spatial variations and temporal variations described above. Such a plot will indicate a tendency for k-ω pairs to appear more or less along a line 124 with some slope, the slope indicating the flow velocity.

Once the power in the k-ω plane is determined, a convective ridge identifier 134 uses one or another feature extraction method to determine the location and orientation (slope) of any convective ridge 124 present in the k-ω plane. In one embodiment, a so-called slant stacking method is used, a method in which the accumulated frequency of k-ω pairs in the k-ω plot along different rays emanating from the origin are compared, each different ray being associated with a different trial convection velocity (in that the slope of a ray is assumed to be the flow velocity or correlated to the flow velocity in a known way). The convective ridge identifier 134 provides information about the different trial convection velocities, information referred to generally as convective ridge information.

The analyzer 136 examines the convective ridge information including the convective ridge orientation (slope). Assuming the straight-line dispersion relation given by k=ω/u, the analyzer 136 determines the flow velocity, Mach number and/or volumetric flow, which are output as parameters 21. The volumetric flow is determined by multiplying the cross-sectional area of the inside of the pipe with the velocity of the process flow.

Some or all of the functions within the flow logic 36 may be implemented in software (using a microprocessor or computer) and/or firmware, or may be implemented using analog and/or digital hardware, having sufficient memory, interfaces, and capacity to perform the functions described herein.

Speed of Sound (SOS) Processing

Figure 17:
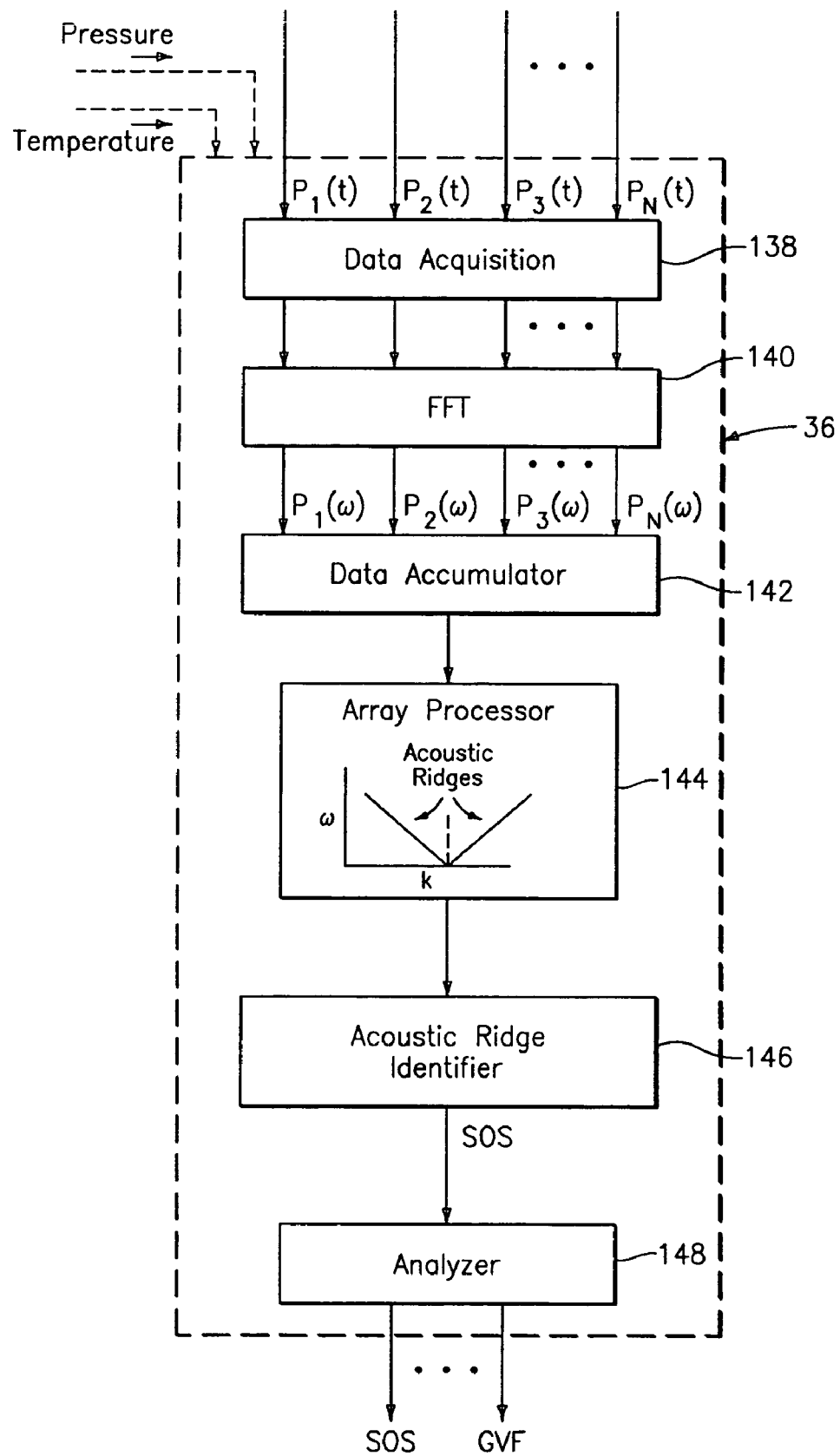
FIG. 17 is a block diagram of a second embodiment of a flow logic used in the apparatus of the present invention.
Figure 18:
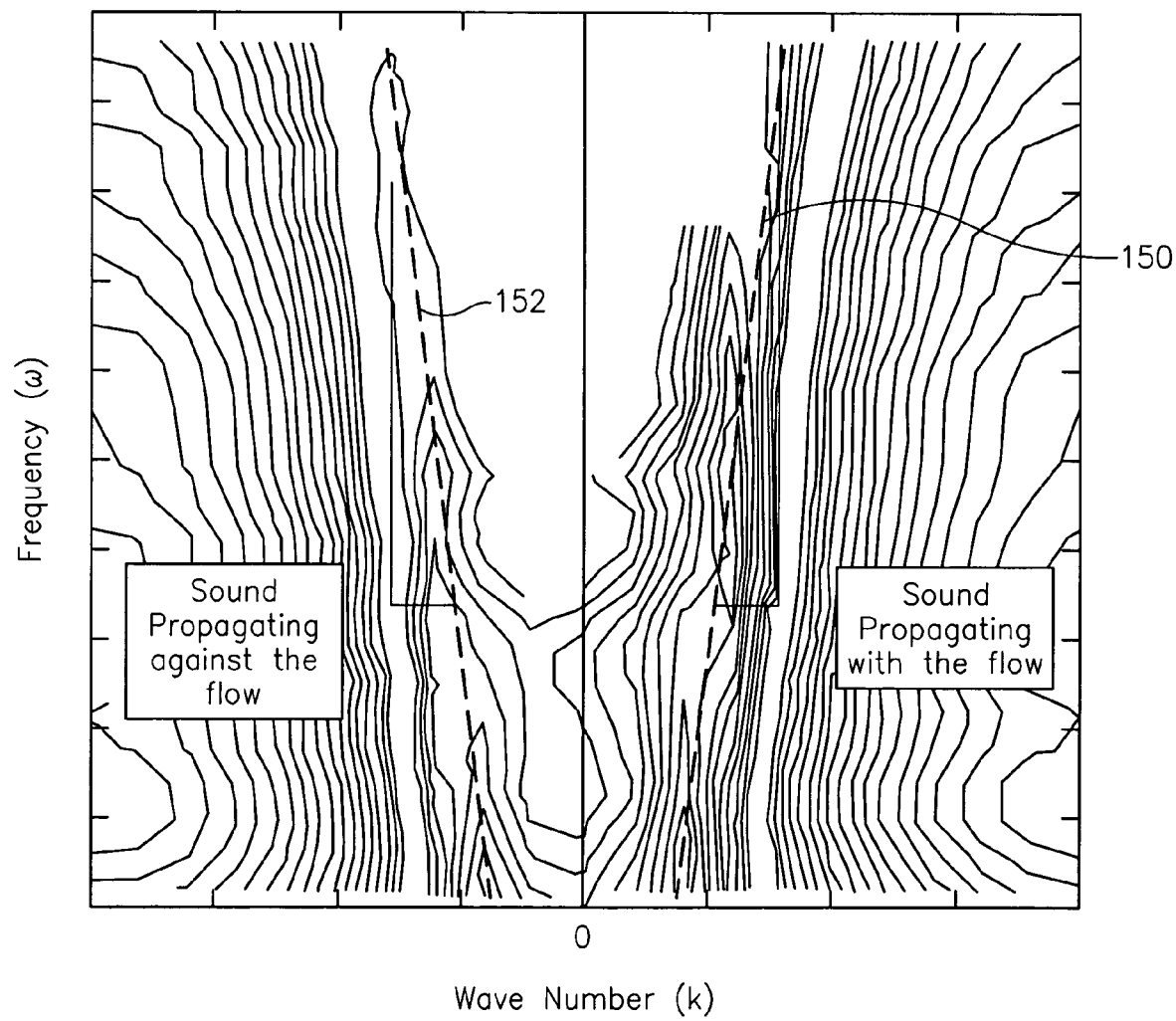
FIG. 18 a kω plot of data processed from an apparatus embodying the present invention that illustrates slope of the acoustic ridges, in accordance with the present invention.

Referring to FIG. 17, another example of flow logic 36 is shown. While the examples of FIG. 17 and FIG. 18 are shown separately, it is contemplated that the flow logic 36 may perform all of the functions described with reference to both FIG. 17 and FIG. 18. As previously described, the optical measurement device 12 provides analog pressure time-varying signals $P_1(t),P_2(t),P_3(t),P_N(t)$ to the flow logic 36. The flow logic 36 processes the signals $P_1(t),P_2(t),P_3(t),P_N(t)$ to first provide output signals indicative of the speed of sound propagating through the fluid (process flow) 13, and subsequently, provide output signals in response to pressure disturbances generated by acoustic waves propagating through the process flow 13, such as velocity, Mach number and volumetric flow rate of the process flow 13. Where the optical measurement device 12 provides an array of data at each position $x_1$, $x_2$, $x_3$, ... $x_N$, (i.e., $P_{1,1}(t)–P_{1,Z}(t) ... P_{N,1}(t)–P_{N,Z}(t)$) this data is first processed (e.g., averaged and/or selected as previously described) by the signal processor 19, which applies the resulting signals $P_1(t),P_2(t),P_3(t),P_N(t)$ to the flow logic 36.

A data acquisition unit 138 digitizes pressure signals $P_1(t)–P_N(t)$ associated with the acoustic waves 122 propagating through the pipe 14. Similarly to the FFT logic 128 of FIG. 14, an FFT logic 140 calculates the Fourier transform of the digitized time-based input signals $P_1(t)–P_N(t)$ and provide complex frequency domain (or frequency based) signals $P_1(\omega),P_2(\omega),P_3(\omega),P_N(\omega)$ indicative of the frequency content of the input signals.

A data accumulator 142 accumulates the frequency signals $P_1(\omega)-P_N(\omega)$ over a sampling interval, and provides the data to an array processor 144, which performs a spatial-temporal (two-dimensional) transform of the sensor data, from the xt domain to the k-ω domain, and then calculates the power in the k-ω plane, as represented by a k-ω plot.

To calculate the power in the k-ω plane, as represented by a k-ω plot (see FIG. 18) of either the signals or the differenced signals, the array processor 144 determines the wavelength and so the (spatial) wavenumber k, and also the (temporal) frequency and so the angular frequency ω, of various of the spectral components of the stochastic parameter. There are numerous algorithms available in the public domain to perform the spatial/temporal decomposition of an array of pressure measurements.

In the case of suitable acoustic waves 122 being present in both axial directions, the power in the k-ω plane shown in a k-ω plot of FIG. 18 so determined will exhibit a structure that is called an acoustic ridge 150, 152 in both the left and right planes of the plot, wherein one of the acoustic ridges 150 is indicative of the speed of sound traveling in one axial direction and the other acoustic ridge 152 being indicative of the speed of sound traveling in the other axial direction. The acoustic ridges represent the concentration of a stochastic parameter that propagates through the flow and is a mathematical manifestation of the relationship between the spatial variations and temporal variations described above. Such a plot will indicate a tendency for k-ω pairs to appear more or less along a line 150, 152 with some slope, the slope indicating the speed of sound.

The power in the k-ω plane so determined is then provided to an acoustic ridge identifier 146, which uses one or another feature extraction method to determine the location and orientation (slope) of any acoustic ridge present in the left and right k-ω plane. The velocity may be determined by using the slope of one of the two acoustic ridges 150, 152 or averaging the slopes of the acoustic ridges 150, 152.

Finally, information including the acoustic ridge orientation (slope) is used by an analyzer 148 to determine the flow parameters relating to measured speed of sound, such as the consistency or composition of the flow, the density of the flow, the average size of particles in the flow, the air/mass ratio of the flow, gas volume fraction of the flow, the speed of sound propagating through the flow, and/or the percentage of entrained air within the flow.

Similar to the array processor 132 of FIG. 14, the array processor 144 uses standard so-called beam forming, array processing, or adaptive array-processing algorithms, i.e. algorithms for processing the sensor signals using various delays and weighting to create suitable phase relationships between the signals provided by the different sensors, thereby creating phased antenna array functionality. In other words, the beam forming or array processing algorithms transform the time domain signals from the array of axial measurements into their spatial and temporal frequency components, i.e. into a set of wave numbers given by $k=2\pi/\lambda$ where $\lambda$ is the wavelength of a spectral component, and corresponding angular frequencies given by $\omega=2\pi\nu$.

One such technique of determining the speed of sound propagating through the process flow 13 is using array processing techniques to define an acoustic ridge in the k-ω plane as shown in FIG. 18. The slope of the acoustic ridge is indicative of the speed of sound propagating through the process flow 13. The speed of sound (SOS) is determined by applying sonar arraying processing techniques to determine the speed at which the one dimensional acoustic waves propagate past the axial array of unsteady pressure measurements distributed along the pipe 14.

The flow logic 36 of the present embodiment measures the speed of sound (SOS) of one-dimensional sound waves propagating through the process flow 13 to determine the gas volume fraction of the process flow 13. It is known that sound propagates through various mediums at various speeds in such fields as SONAR and RADAR fields. The speed of sound propagating through the pipe 14 and process flow 13 may be determined using a number of known techniques, such as those set forth in U.S. patent application Ser. No. 09/344,094, filed Jun. 25, 1999, now U.S. Pat. No. 6,354,147; U.S. patent application Ser. No. 10/795,111, filed Mar. 4, 2004; U.S. patent application Ser. No. 09/997,221, filed Nov. 28, 2001, now U.S. Pat. No. 6,587,798; U.S. patent application Ser. No. 10/007,749, filed Nov. 7, 2001, and U.S. patent application Ser. No. 10/762,410, filed Jan. 21, 2004, each of which are incorporated herein by reference.

While the sonar-based flow meter using an array of pressure measurements to measure the speed of sound of an acoustic wave propagating through the mixture is shown and described, one will appreciate that any means for measuring the speed of sound of the acoustic wave may used to determine the entrained gas volume fraction of the mixture/fluid or other characteristics of the flow described hereinbefore.

The analyzer 148 of the flow logic 36 provides output parameters 21 indicative of characteristics of the process flow 13 that are related to the measured speed of sound (SOS) propagating through the process flow 13. For example, to determine the gas volume fraction (or phase fraction), the analyzer 148 assumes a nearly isothermal condition for the process flow 13. As such the gas volume fraction or the void fraction is related to the speed of sound by the following quadratic equation:

$$Ax^2+Bx+C=0$$

wherein x is the speed of sound, $A=1+rg/rl*(K_{eff}/P-1)-K_{eff}/P$, $B=K_{eff}/P-2+rg/rl$; $C=1-K_{eff}/rl*a_{meas}\hat{\ }2$); Rg=gas density, rl=liquid density, $K_{eff}$=effective K (modulus of the liquid and pipewall), P=pressure, and $a_{meas}$=measured speed of sound.

Effectively, $$\text{Gas Voulume Fraction (GVF)}=(-B+sqrt(B\hat{\ }2-4*A*C))/(2*A)$$

Alternatively, the sound speed of a mixture can be related to volumetric phase fraction ($\phi_i$) of the components and the sound speed (a) and densities (ρ) of the component through the Wood equation.

$$\frac{1}{\rho_{mix}a_{mix\infty}^2} = \sum_{i=1}^{N} \frac{\phi_i}{\rho_i a_i^2} \text{ where } \rho_{mix} = \sum_{i=1}^{N} \rho_i \phi_i$$

One dimensional compression waves propagating within a process flow 13 contained within a pipe 14 exert an unsteady internal pressure loading on the pipe. The degree to which the pipe displaces as a result of the unsteady pressure loading influences the speed of propagation of the compression wave. The relationship among the infinite domain speed of sound and density of a mixture; the elastic modulus (E), thickness (t), and radius (R) of a vacuum-backed cylindrical conduit; and the effective propagation velocity ($a_{eff}$) for one dimensional compression is given by the following expression:

$$a_{\mathit{eff}} = \cfrac{1}{\sqrt{1/a_{\mathit{mix}\infty}^2 + \rho_{\mathit{mix}}\cfrac{2R}{Et}}} \qquad (\text{eq 1})$$

Figure 19:
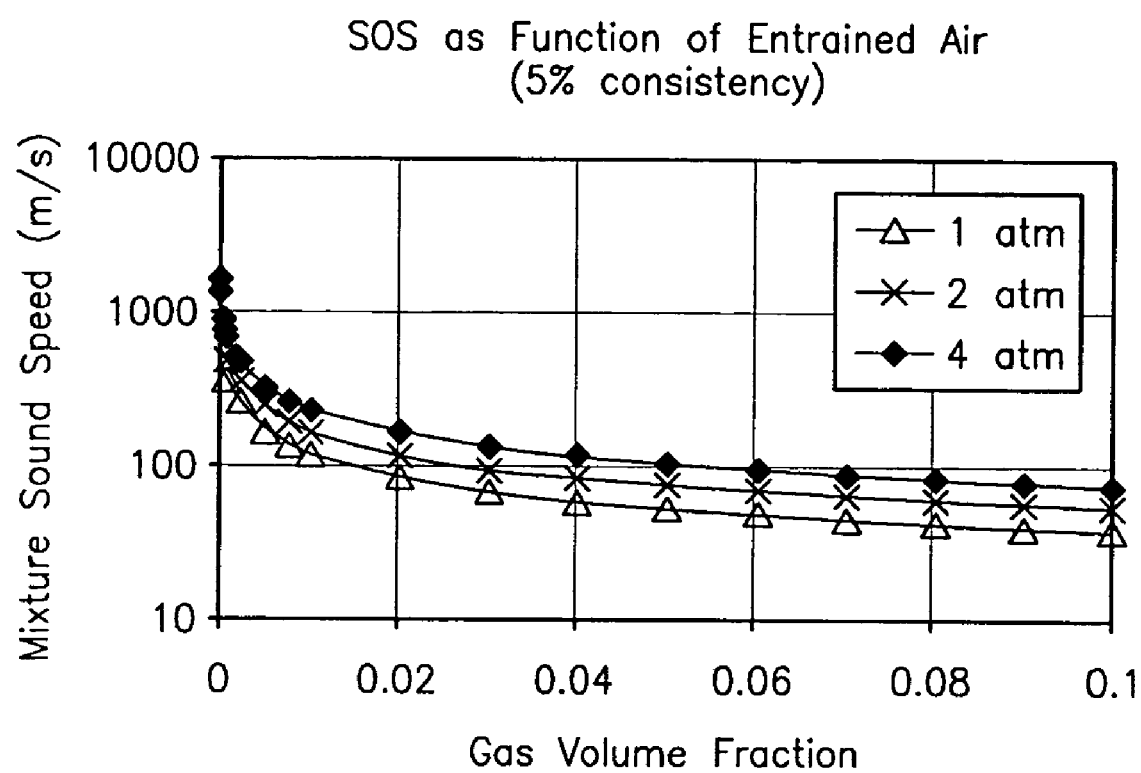
FIG. 19 is a plot of mixture sound speed as a function of gas volume fraction for a 5% consistency slurry over a range of process pressures, in accordance with the present invention.

The mixing rule essentially states that the compressibility of a process flow ($1/(\rho a^2)$) is the volumetrically-weighted average of the compressibilities of the components. For a process flow 13 consisting of a gas/liquid mixture at pressure and temperatures typical of paper and pulp industry, the compressibility of gas phase is orders of magnitudes greater than that of the liquid. Thus, the compressibility of the gas phase and the density of the liquid phase primarily determine mixture sound speed, and as such, it is necessary to have a good estimate of process pressure to interpret mixture sound speed in terms of volumetric fraction of entrained gas. The effect of process pressure on the relationship between sound speed and entrained air volume fraction is shown in FIG. 19.

As described hereinbefore, the flow logic 36 of the present embodiment includes the ability to accurately determine the average particle size of a particle/air or droplet/air mixture within the pipe 14 and the air to particle ratio. Provided there is no appreciable slip between the air and the solid coal particle, the propagation of one dimensional sound wave through multiphase mixtures is influenced by the effective mass and the effective compressibility of the mixture. For an air transport system, the degree to which the no-slip assumption applies is a strong function of particle size and frequency. In the limit of small particles and low frequency, the no-slip assumption is valid. As the size of the particles increases and the frequency of the sound waves increase, the non-slip assumption becomes increasing less valid. For a given average particle size, the increase in slip with frequency causes dispersion, or, in other words, the sound speed of the mixture to change with frequency. With appropriate calibration the dispersive characteristic of a process flow 13 will provide a measurement of the average particle size, as well as, the air to particle ratio (particle/fluid ratio) of the process flow 13.

In accordance with the present invention the dispersive nature of the system utilizes a first principles model of the interaction between the air and particles. This model is viewed as being representative of a class of models that seek to account for dispersive effects. Other models could be used to account for dispersive effects without altering the intent of this disclosure (for example, see the paper titled "Viscous Attenuation of Acoustic Waves in Suspensions" by R. L. Gibson, Jr. and M. N. Toksöz), which is incorporated herein by reference. The model allows for slip between the local velocity of the continuous fluid phase and that of the particles.

The following relation can be derived for the dispersive behavior of an idealized fluid particle mixture.

$$a_{\mathit{mix}}(\omega) = a_f \sqrt{\cfrac{1}{1+\cfrac{\varphi_p \rho_p}{\rho_f\left(1+\omega^2 \cfrac{\rho_p^2 v_p^2}{K^2}\right)}}}$$

In the above relation, the fluid SOS, density ($\rho$) and viscosity ($\phi$) are those of the pure phase fluid, $v_p$ is the volume of individual particles and $\phi_p$ is the volumetric phase fraction of the particles in the mixture.

Figure 20:
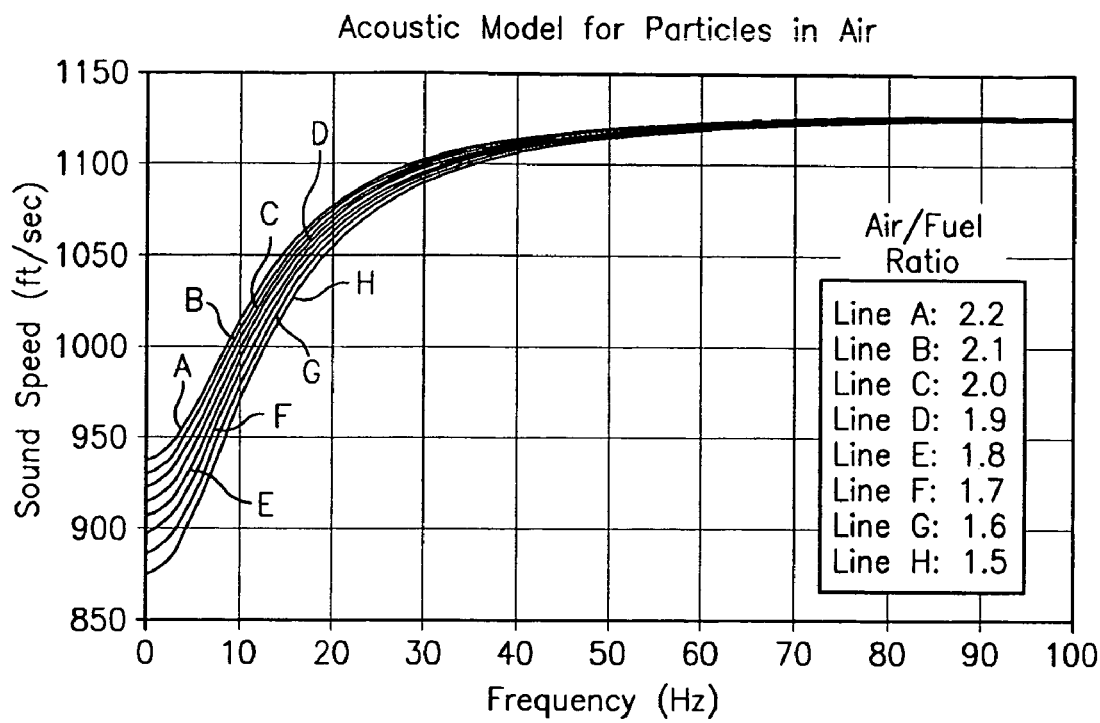
FIG. 20 is a plot of sound speed as a function of frequency for air/particle mixtures with fixed particle size and varying air-to-particle mass ratio in accordance with the present invention.
Figure 21:
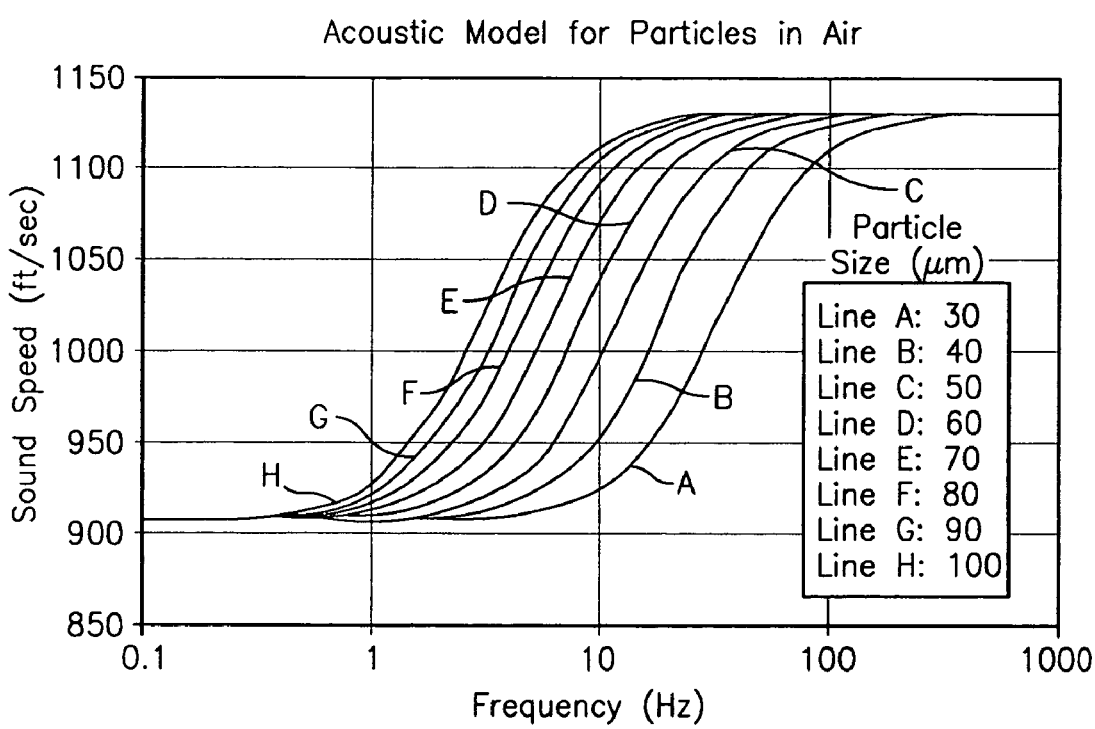
FIG. 21 is a plot of sound speed as a function of frequency for air/particle mixtures with varying particle size where the air-to-particle mass ratio is fixed in accordance with the present invention.

Two parameters of particular interest in steam processes and air-conveyed particles processes are particle size and air-to-fuel mass ratio or steam quality. To this end, it is of interest to examine the dispersive characteristics of the mixture as a function of these two variables. FIG. 20 and FIG. 21 show the dispersive behavior in relations to the speed of sound for coal/air mixtures with parameters typical of those used in pulverized coal deliver systems.

In particular FIG. 20 shows the predicted behavior for nominally 50 μm size coal in air for a range of air-to-fuel ratios. As shown, the effect of air-to-fuel ratio is well defined in the low frequency limit. However, the effect of the air-to-fuel ratio becomes indistinguishable at higher frequencies, approaching the sound speed of the pure air at high frequencies (above ~100 Hz).

Similarly, FIG. 21 shows the predicted behavior for a coal/air mixture with an air-to-fuel ratio of 1.8 with varying particle size. This figure illustrates that particle size has no influence on either the low frequency limit (quasi-steady) sound speed, or on the high frequency limit of the sound speed. However, particle size does have a pronounced effect in the transition region.

FIG. 20 and FIG. 21 illustrate an important aspect of the present invention. Namely, that the dispersive properties of dilute mixtures of particles suspended in a continuous liquid can be broadly classified into three frequency regimes: low frequency range, high frequency range and a transitional frequency range. Although the effect of particle size and air-to-fuel ratio are inter-related, the predominant effect of air-to-fuel ratio is to determine the low frequency limit of the sound speed to be measured and the predominate effect of particle size is to determine the frequency range of the transitional regions. As particle size increases, the frequency at which the dispersive properties appear decreases. For typical pulverized coal applications, this transitional region begins at fairly low frequencies, ~2 Hz for 50 μm size particles.

Given the difficulties measuring sufficiently low frequencies to apply the quasi-steady model and recognizing that the high frequency sound speed contains no direct information on either particle size or air-to-fuel ratio, it becomes apparent that the dispersive characteristics of the coal/air mixture should be utilized to determine particle size and air-to-fuel ratio based on speed of sound measurements.

Some or all of the functions within the flow logic 36 may be implemented in software (using a microprocessor or computer) and/or firmware, or may be implemented using analog and/or digital hardware, having sufficient memory, interfaces, and capacity to perform the functions described herein.

While FIG. 14 and FIG. 17 depict two different embodiments of the flow logic 36 to measure various parameters of the flow process, the present invention contemplates that the functions of these two embodiments may be performed by a single flow logic 36.

It should be understood that any of the features, characteristics, alternatives or modifications described regarding a particular embodiment herein may also be applied, used, or incorporated with any other embodiment described herein.

Although the invention has been described and illustrated with respect to exemplary embodiments thereof, the foregoing and various other additions and omissions may be made therein and thereto without departing from the spirit and scope of the present invention.

What is claimed is:

1. An apparatus for measuring at least one parameter associated with a fluid flowing within a pipe, the apparatus comprising:
   an optical measurement device that, in response to light reflected from an outer surface of the pipe, provides output signals indicative of unsteady pressures within the fluid at two or more locations axially along the pipe; and
   a signal processor that, in response to the output signals from the optical measurement device, provides an output signal indicative of at least one parameter associated with the fluid flowing within the pipe.

2. The apparatus of claim 1, wherein the optical measurement device includes an electronic speckle pattern interferometer.

3. The apparatus of claim 1, wherein the optical measurement device includes a Fabry-Perot cavity.

4. The apparatus of claim 3, further comprising:
   a strap disposed around the pipe, the strap having a pair of opposing, spaced-apart surfaces disposed thereon and forming the Fabry-Perot cavity.

5. The apparatus of claim 1 wherein the optical measurement device includes at least one laser vibrometer.

6. The apparatus of claim 5, wherein the at least one laser vibrometer includes one or more of: a single point laser vibrometer, a scanning laser vibrometer, and a 3D laser vibrometer.

7. The apparatus of claim 1, wherein the optical measurement device directs one or more laser beam discretely at the two or more locations to provide the light reflected from the outer surface of the pipe.

8. The apparatus of claim 7, wherein an axial distance between the two or more locations is adjustable.

9. The apparatus of claim 1, wherein the optical measurement device scans one or more laser beam axially along the pipe to provide the light reflected from the outer surface of the pipe.

10. The apparatus of claim 9, wherein the output signals from the optical measurement device include a plurality of readings taken axially across the pipe, and wherein the signal processor selects the readings taken at the two or more locations.

11. The apparatus of claim 1, wherein the optical measurement device scans one or more laser beam radially across the pipe at each of the two or more locations to provide the light reflected from the outer surface of the pipe.

12. The apparatus of claim 11, wherein an axial distance between the two or more locations is adjustable.

13. The apparatus of claim 11, wherein the output signals from the optical measurement device include a plurality of readings taken radially across the pipe at each of the two or more locations, and wherein the signal processor averages the plurality of readings at each of the two or more locations to compensate for bending modes caused by the flexing of the pipe.

14. The apparatus of claim 1, wherein the optical measurement device projects defocused laser light onto the pipe to provide the light reflected from the outer surface of the pipe.

15. The apparatus of claim 14, wherein the output signals from the optical measurement device are indicative of unsteady pressures within the fluid at multiple locations throughout an area of the pipe onto which the defocused laser light is projected, and wherein the signal processor processes only a portion of the output signals from the optical measurement device.

16. The apparatus of claim 15, wherein the output signals from the optical measurement device include a plurality of readings taken radially across the pipe at each of the two or more locations, and wherein the signal processor averages the plurality of readings at each of the two or more locations to compensate for bending modes caused by the flexing of the pipe.

17. The apparatus of claim 15, wherein the output signals from the optical measurement device include a plurality of readings taken axially across the pipe, and wherein the signal processor selects the readings taken at the two or more locations.

18. The apparatus of claim 1, further comprising:
   a flange extending radially from the pipe, and wherein the optical measurement device reflects light off of the flange to compensate for whole body motion of the pipe.

19. The apparatus of claim 1, wherein the optical measurement device emits laser light from two or more devices disposed axially along the pipe.

20. The apparatus of claim 1, wherein the optical measurement device emits laser light from two or more devices disposed radially around the pipe.

21. The apparatus of claim 1, wherein the optical measurement device is handheld.

22. The apparatus of claim 21, wherein the optical measurement device clamps around at least a portion of the pipe.

23. The apparatus of claim 1, wherein the optical measurement device is attached to the pipe.

24. The apparatus of claim 23, wherein the optical measurement device is thermally insulated from the pipe.

25. The apparatus of claim 1, wherein the at least one parameter includes at least one of: density of the fluid, volumetric flow rate of the fluid, mass flow rate of the fluid, velocity of the fluid, composition of the fluid, entrained gas in the fluid, consistency of the fluid, size of particles in the fluid, and health of a device causing the unsteady pressures to be generated in the pipe.

26. The apparatus of claim 1, wherein the optical measurement device, in response to light reflected from the outer surface of the pipe, provides output signals indicative of unsteady pressures within the fluid at 3 locations disposed axially along the pipe.

27. The apparatus of claim 1, wherein the optical measurement device, in response to light reflected from the outer surface of the pipe, provides output signals indicative of unsteady pressures within the fluid at 4, 5, 6, 7, 8, 9, 10, 11, 12, 13, 14, 15, or 16 locations disposed axially along the pipe.

28. The apparatus of claim 1, wherein the optical measurement device measures a vortical field at each respective axial location along the pipe.

29. The apparatus of claim 1, wherein the signal processor, in response to the output signals, determines the slope of a convective ridge in k-$\omega$ plane to determine the velocity of the fluid flowing in the pipe.

30. The apparatus of claim 29, wherein the parameter of the flow is a flow rate and/or a volumetric flow rate of the flow.

31. The apparatus of claim 1, wherein the optical measurement device measures an acoustic wave propagating axially through the fluid at each respective axial location along the pipe.

32. The apparatus of claim 1, wherein the signal processor, in response to the output signals, determines the slope of an acoustic ridge in k-Ωplane to determine a speed of sound signal indicative of the speed of sound propagating axially through the fluid flowing in the pipe.

33. The apparatus of claim 32, wherein the signal processor, in response to the speed of sound signal, the parameter of the flow is a percentage of entrained gas within the flow.

34. The apparatus of claim 1, wherein the signal processor determines the parameter of the flow using an adaptive array processing algorithm.

35. A method for measuring at least one parameter associated with a fluid flowing within a pipe, the method comprising:
- in response to light reflected from an outer surface of the pipe, providing output signals indicative of unsteady pressures within the fluid at two or more locations axially along the pipe;
- determining at least one parameter associated with the fluid flowing within the pipe using the output signals; and
- providing an output corresponding to the at least one parameter.

36. The method of claim 35, further comprising:
- providing the signals indicative of unsteady pressures within the fluid in response to detecting interference fringes formed by light beams transmitted from a Fabry-Perot cavity coupled to the pipe.

37. The method of claim 35, further comprising:
- directing one or more laser beam discretely at the two or more locations to provide the light reflected from the outer surface of the pipe.

38. The method of claim 37, further comprising:
- adjusting an axial distance between the two or more locations.

39. The method of claim 37, further comprising:
- scanning one or more laser beam axially along the pipe to provide the light reflected from the outer surface of the pipe.

40. The method of claim 39, wherein the output signals include a plurality of readings taken axially across the pipe, and wherein the method further comprises:
- selecting the readings taken at the two or more locations from the plurality of readings.

41. The method of claim 35, further comprising:
- scanning one or more laser beam radially across the pipe at each of the two or more locations to provide the light reflected from the outer surface of the pipe.

42. The method of claim 41, further comprising:
- adjusting an axial distance between the two or more locations.

43. The method of claim 41, wherein the output signals include a plurality of readings taken radially across the pipe at each of the two or more locations, and wherein the method further comprises:
- averaging the plurality of readings at each of the two or more locations to compensate for bending modes caused by the flexing of the pipe.

44. The method of claim 35, further comprising:
- projecting defocused laser light onto the pipe to provide the light reflected from the outer surface of the pipe.

45. The method of claim 44, wherein the output signals are indicative of unsteady pressures within the fluid at multiple locations throughout an area of the pipe onto which the defocused laser light is projected, and wherein the method further comprises:
- processing only a portion of the output signals.

46. The method of claim 45, wherein the output signals include a plurality of readings taken radially across the pipe at each of the two or more locations, and wherein the method further comprises:
- averaging the plurality of readings at each of the two or more locations to compensate for bending modes caused by the flexing of the pipe.

47. The method of claim 45, wherein the output signals include a plurality of readings taken axially across the pipe, and wherein the method further comprises:
- selecting the readings taken at the two or more locations from the plurality of readings.

48. The method of claim 35, further comprising:
- reflecting light off of a flange extending radially from the pipe to compensate for whole body motion of the pipe.

* * * * *